United States Patent [19]
Kojima et al.

[11] Patent Number: 5,949,921
[45] Date of Patent: *Sep. 7, 1999

[54] IMAGE PROCESSING APPARATUS FOR READING AN IMAGE BY HAND SCANNING

[75] Inventors: Akio Kojima, Neyagawa; Kazuyuki Murata, Tsuzuki-gun; Yasuhiro Kuwahara, Osaka; Naoki Takahashi, Moriguchi, all of Japan

[73] Assignee: Matsushita Electric Industrial Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/512,908

[22] Filed: Aug. 9, 1995

[30] Foreign Application Priority Data

Aug. 9, 1994 [JP] Japan ................................. 6-187481
Aug. 9, 1994 [JP] Japan ................................. 6-187483

[51] Int. Cl.$^6$ ................................. G06K 9/40; G06K 9/22
[52] U.S. Cl. ......................... 382/295; 382/275; 382/313
[58] Field of Search .................................. 382/313, 300, 382/278, 275, 291, 257, 151, 293, 295

[56] References Cited

U.S. PATENT DOCUMENTS

| | | | |
|---|---|---|---|
| 4,260,979 | 4/1981 | Smith | 340/146.3 H |
| 4,581,761 | 4/1986 | Ichinokawa et al. | 382/13 |
| 4,949,391 | 8/1990 | Faulkerson et al. | 382/313 |
| 5,296,690 | 3/1994 | Chandler et al. | 382/291 |
| 5,355,146 | 10/1994 | Chiu et al. | 382/313 |
| 5,757,981 | 5/1998 | Kawakubo | 382/293 |

FOREIGN PATENT DOCUMENTS 62-15964  1/1987  Japan ............................. H04N 1/04

Primary Examiner—Jose L. Couso
Assistant Examiner—Matthew C. Bella
Attorney, Agent, or Firm—Morrison & Foerster LLP

[57] ABSTRACT

A scanner for reading an original image by hand scanning usually detects scanning positions of the reading sensor on the original image sequentially and stores read image data into image memory according to said scanning positions. However, an area in which the image data is not stored may appear when free scanning is done such that its pixel density exceeds a permitted limit. This area, if it appears, degrades the quality of the image which is reproduced in the image memory. The scanner of the invention detects the area in which the image data has not been stored, and prevents the appearance of such an area in the resulting image. It also judges an abnormal state that is beyond the prevention capacity and informs the operator of such a state. Furthermore, when it detects a scanning error caused by sensor problems, it halts storing the image data and informs the operator of the scanning error.

11 Claims, 30 Drawing Sheets

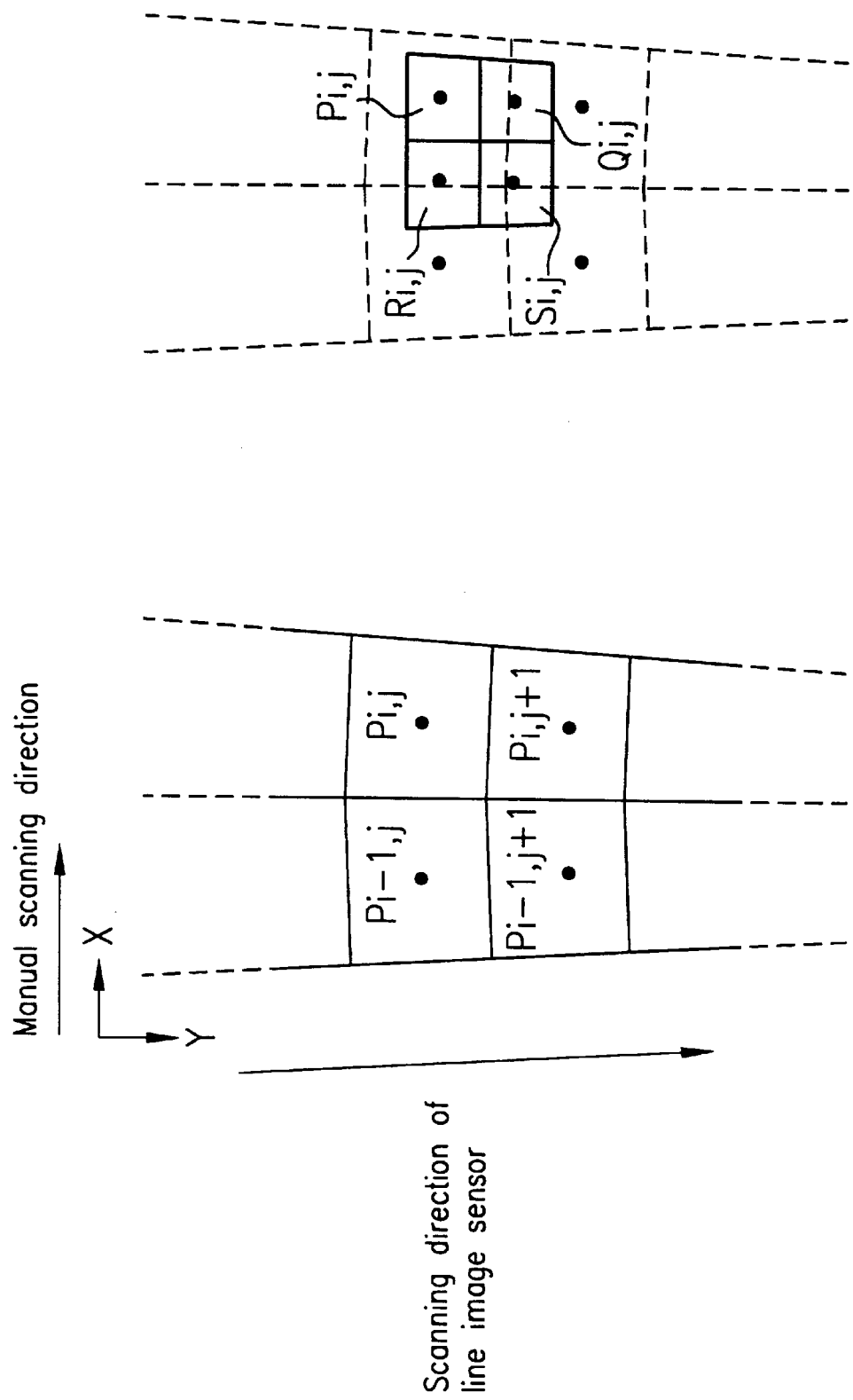

a is an overlapping scanning area
b is a new scanning area

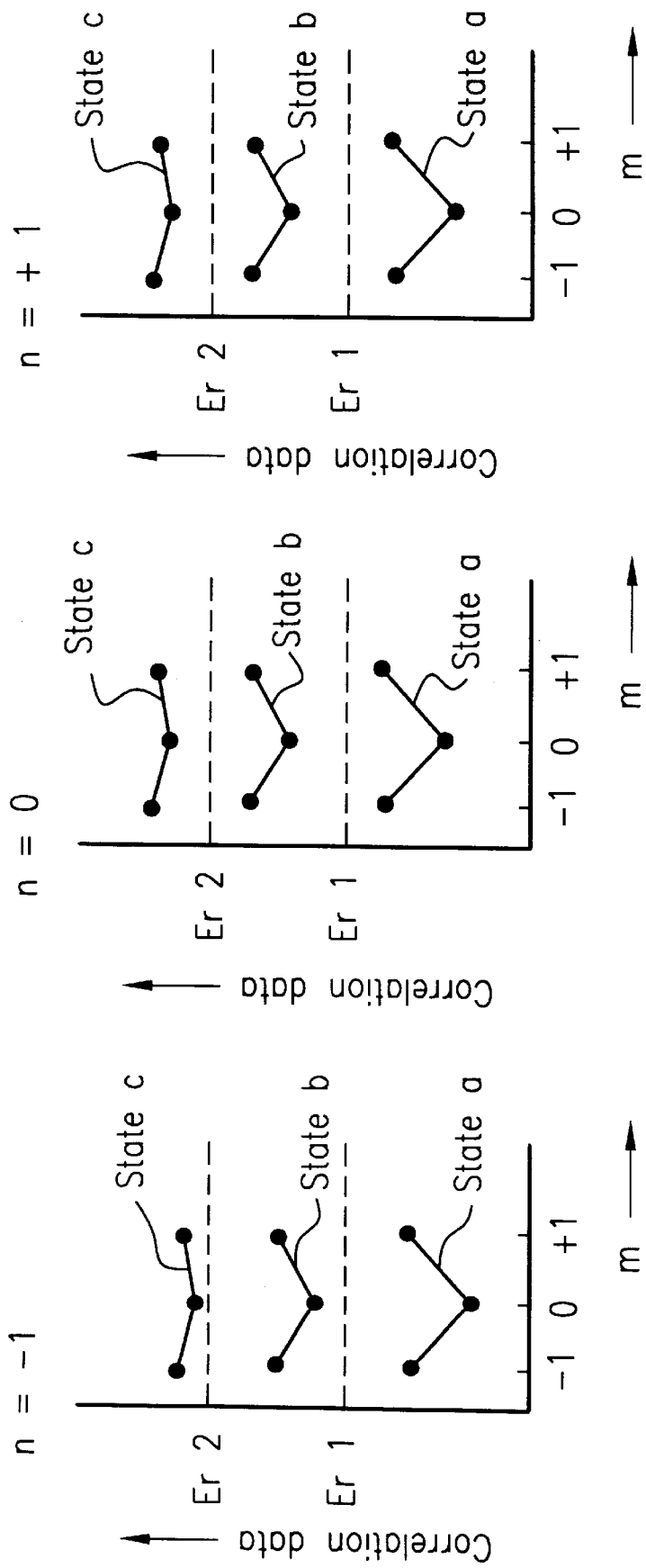

IMAGE PROCESSING APPARATUS FOR READING AN IMAGE BY HAND SCANNING

FIELD OF THE INVENTION

This invention relates to an image processing apparatus which reads image data by scanning an original image and storing it into an image memory based on a scanning position corresponding to the image data.

BACKGROUND OF THE INVENTION

When a hand-held scanner that reads an original image as it is being freely scanned across the surface of the original is used, it usually functions such that scanning positions; of an image sensor on the original are detected sequentially and image data is stored into an image memory on the basis of the scanning positions being detected.

An example of a method of detecting scanning positions of an image sensor on an original is disclosed in U.S. Pat. No. 4,260,979. This method uses a sheet with a reference grid printed on it as auxiliary equipment. This sheet is placed on top of an original, and is scanned with a photosensing element that is integrated with an image sensor for detecting the reference grid. A position of image data relative to the reference grid then is calculated from an output of the photosensing element.

Another method is disclosed, for example, in U.S. Pat. No. 4,581,761, which uses a tablet as auxiliary equipment. An original placed on top of the tablet, and is scanned with a detection coil that is integrated with an image sensor, A coordinate position on the tablet is detected from an output of the detection coil, and a position of the image data is calculated based on the coordinate position being detected.

Yet another method is disclosed, for example, in Laid-open Japanese Patent Application No. (Tokkai Sho) 62-15964, in which an encoder is installed with a wheel that moves together with an image sensor and generates a pulse in accordance with the wheel rotation. A position of the image sensor is detected from an output of the encoder, and a position of image data is calculated on the basis of the detected position.

When an image processing apparatus which applies one of these conventional detection method is used, a coordinate position of image data is calculated based on a scanning position being detected and stored into a predetermined address of an image memory. As a result, this apparatus can be prevented from being influenced by unintentional hand movement or meandering caused by a hand-held scanning, so that image data being stored as storage data in the image memory does not show any distortion.

However, the conventional system mentioned above has the following problems.

When auxiliary equipment, such as a sheet with a reference grid printed on it, or a tablet is used, it is necessary to process with accuracy and to install an expensive adjustment circuit for enhancing accuracy of a scanning position being detected and reducing an absolute position error, so that the cost usually becomes high. In addition, when auxiliary equipment with low accuracy is used, the scanning position being detected shows a large degree of absolute position error.

On the other hand, when an encoder installed with a wheel that moves together with an image sensor and generates pulses in accordance with wheel rotation is used, a scanning position is calculated by counting pulses of the encoder that are detected sequentially with a starting position of scanning as a reference point. As a result, a large degree of cumulative position error occurs due to low machine accuracy and slipping of the wheel.

When an absolute position error or a cumulative position error of a scanning position being detected reaches a large degree, a large position error arises with a normal scanning position on an original that is scanned by an image sensor.

When a coordinate position of image data is calculated based on this scanning position having a position error and is then stored into a predetermined address in an image memory, images which are reproduced on the image memory show great distortion. The distortion of reproduction images caused by this position error will be explained with reference to FIGS. 19B–19D.

FIG. 19B shows a hand-held scanner 1004 which scans freely on the surface of an original 1000. As shown in FIG. 19C, a prior hand-held scanner which is capable of scanning only one direction can not read a large size area on the original 1000. However, since image data is stored on an image memory only with an area being read by a sensor for one direction, a connection gap does not occur. FIG. 19D shows a case in which a hand-held scanner which reads a large size area on the original 1000 by freely scanning the original. In this case, when image data is stored in an image memory based on a scanning position having a position error, connected parts of the image cause a position error, so that the image is distorted. In particular, when a scanner causing a cumulative position error is used, a position error becomes worse as a scanning area broadens. Thus, it is no longer possible to make out the image itself.

An image distortion caused by a position error can be suppressed by shifting storage positions of image data in direction of X or Y axis as shown in FIG. 22, so that a good image without a connection error can be generated as shown in FIG. 19E.

This process, however, may raise the following problem: As shown in FIG. 22, cells in which no image data is stored may appear due to the process of shifting storage positions of image data (an area of cells in which no image data is stored is hereinafter referred to as a "map missing area"). A map missing area may be a conspicuous white line in a black image, and it degrades the image badly. If a map missing area appears in a character image as shown in FIG. 23, quality of the character image is reduced. A further problem is that an operator is unable to check promptly for the appearance of a map missing area.

Another problem in the current image processing apparatus is that a map missing area may appear when a free scanning is done such that its pixel density exceeds a permitted limit.

The operator cannot check for an abnormal state of the image quality in current image processing devices without performing an operation such as displaying or printing image after image data is stored into the image memory. In this case, the original image must be read again if an abnormal condition has occurred, which reduces the operation efficiency.

SUMMARY OF THE INVENTION

In general, an object of the invention is to solve the above-mentioned problems of conventional systems.

The first object is to provide an image processing apparatus which can reproduce high-quality images in an image memory by detecting a map missing area from a difference between data associated with two separate scanning position to prevent the occurrence of an area without image data in the image memory.

The second object is to provide an image processing apparatus which can inform promptly the operator of the occurrence of an abnormal state when the apparatus cannot prevent the occurrence of an area without image data.

The third object is to provide an image processing apparatus which stops reading image data when it detects abnormal scanning, and informs the operator of the abnormal status.

In order to accomplish these objects, an image processing apparatus of the invention sequentially receives image data being read by scanning an original image and scanning position data corresponding to the image data, and stores the image data into an image memory according to the scanning position data.

In order to accomplish above first and second objects, the first configuration of the image processing apparatus includes means for detecting the appearance of a map missing area from difference of two separate scanning position data. The first configuration enables the image processing apparatus to detect a map missing area from the difference of two separate scanning position data, so as to deal promptly with the detected area.

The second configuration of the image processing apparatus further includes means for preventing appearance of an area without image data as the result. The second configuration enables the image processing apparatus to detect a map missing area from the difference of two separate scanning position data, to prevent the appearance of an area without image data, and to improve thereby the image quality in the memory by preventing the occurrence of white lines in a black image or a character image.

The third configuration of the image processing apparatus further includes means for judging an abnormal state by comparing the difference of two separate scanning position data with a predetermined value, and means for informing the operator of the appearance of the abnormal state according to the judgement. The third configuration enables the image processing apparatus to judge the appearance of an abnormal state by comparing the difference of two separate scanning position data with a predetermined value and to inform the operator of the appearance of the abnormal state according to the judgement, so that the operator can check the abnormal state while scanning. Thus, the operation efficiency is improved by eliminating useless scanning.

Next, to accomplish the third object, the fourth configuration of the image processing apparatus includes means for calculating a correlation between the image data and the stored data in the image memory concerning an overlapping scanned area to produce correlation data based on this correlation, and means for detecting a scanning error based on the correlation data. The fourth configuration enables the image processing apparatus to detect scanning error based on the correlation data, so as to deal with the error promptly.

The fifth configuration of the image processing apparatus further includes means for halting storage of the image data into the image memory when scanning error is detected. The fifth configuration enables the image processing apparatus to prevent storage of image data in the abnormal state as the halting means halts storing the image data during scanning.

The sixth configuration of the image processing apparatus further includes means for informing the operator that a scanning error has been detected. The sixth configuration enables the image processing apparatus to inform the operator of the scanning error promptly when it was detected on the basis of the correlation data, so that the operator can check the scanning error during scanning, which improves operation efficiency.

BRIEF DESCRIPTION OF THE DRAWINGS

FIGS. 9A and 9B are schematic views showing pixel density conversion in the embodiment of FIG. 1.

FIGS. 30A to 30C are graphs showing status of a correlation table generated in a image correlation circuit in the embodiment of FIG. 28.

DETAILED DESCRIPTION OF THE INVENTION

This invention will be described more in detail by referring to the following illustrative examples and attached figures. The examples are not intended to limit the invention in any way.

EXAMPLE 1

Figure 1:
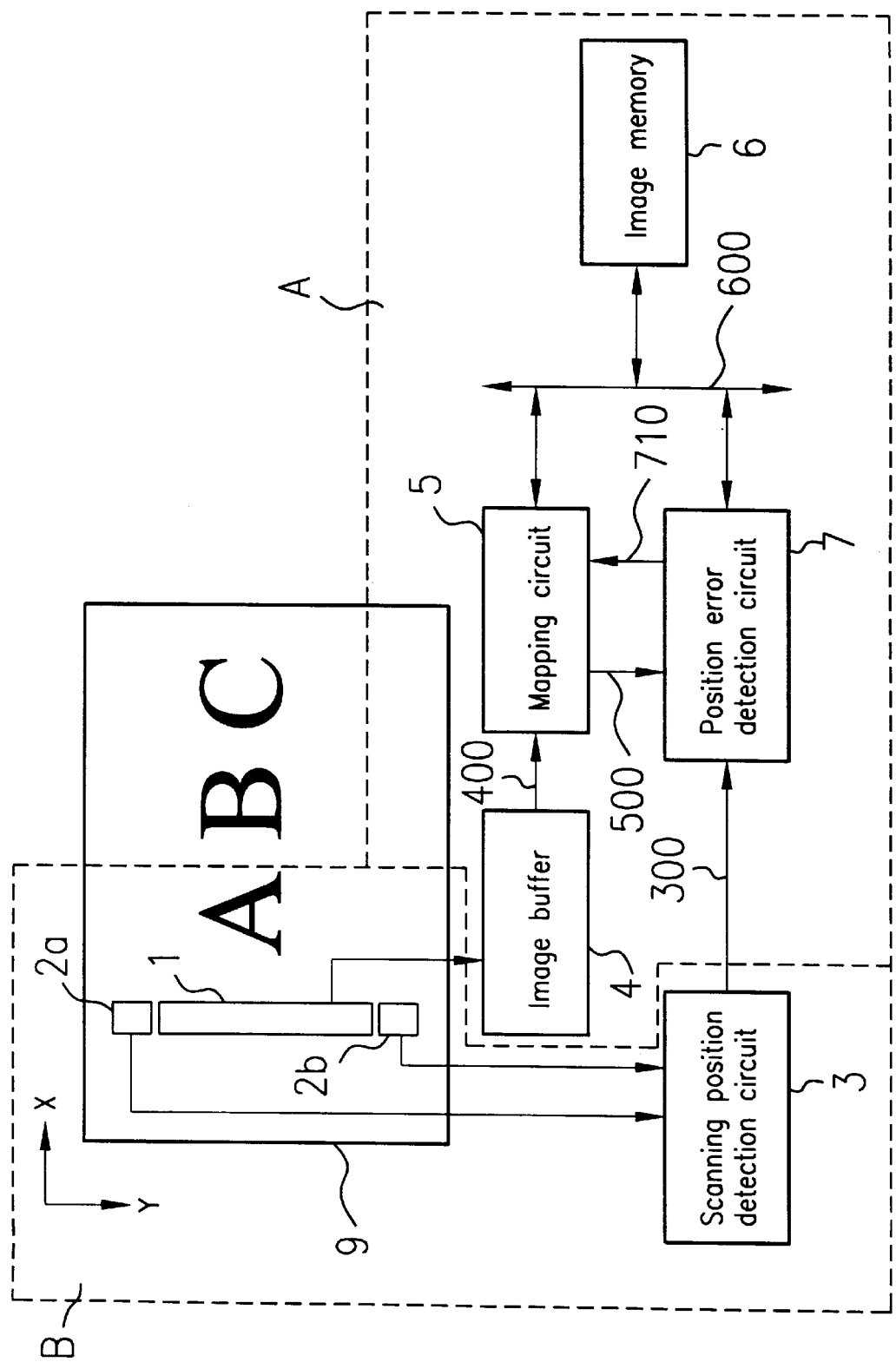
FIG. 1 is a block diagram showing an image processing apparatus and an image reading part that scans and reads an original image in a first embodiment of the invention.

A first embodiment of an image processing apparatus of the invention will now be explained with reference to FIG. 1, which is a block diagram showing an image processing apparatus and an image reading part which scans and reads an original image. In FIG. 1, A represents an image processing apparatus, and B represents an image reading part.

As shown in FIG. 1, a line image sensor 1 scans on the surface of an original 9 by being hand-operated and reads an original to produce image data. Thus produced image data then is supplied to an image buffer 4.

Figure 16:
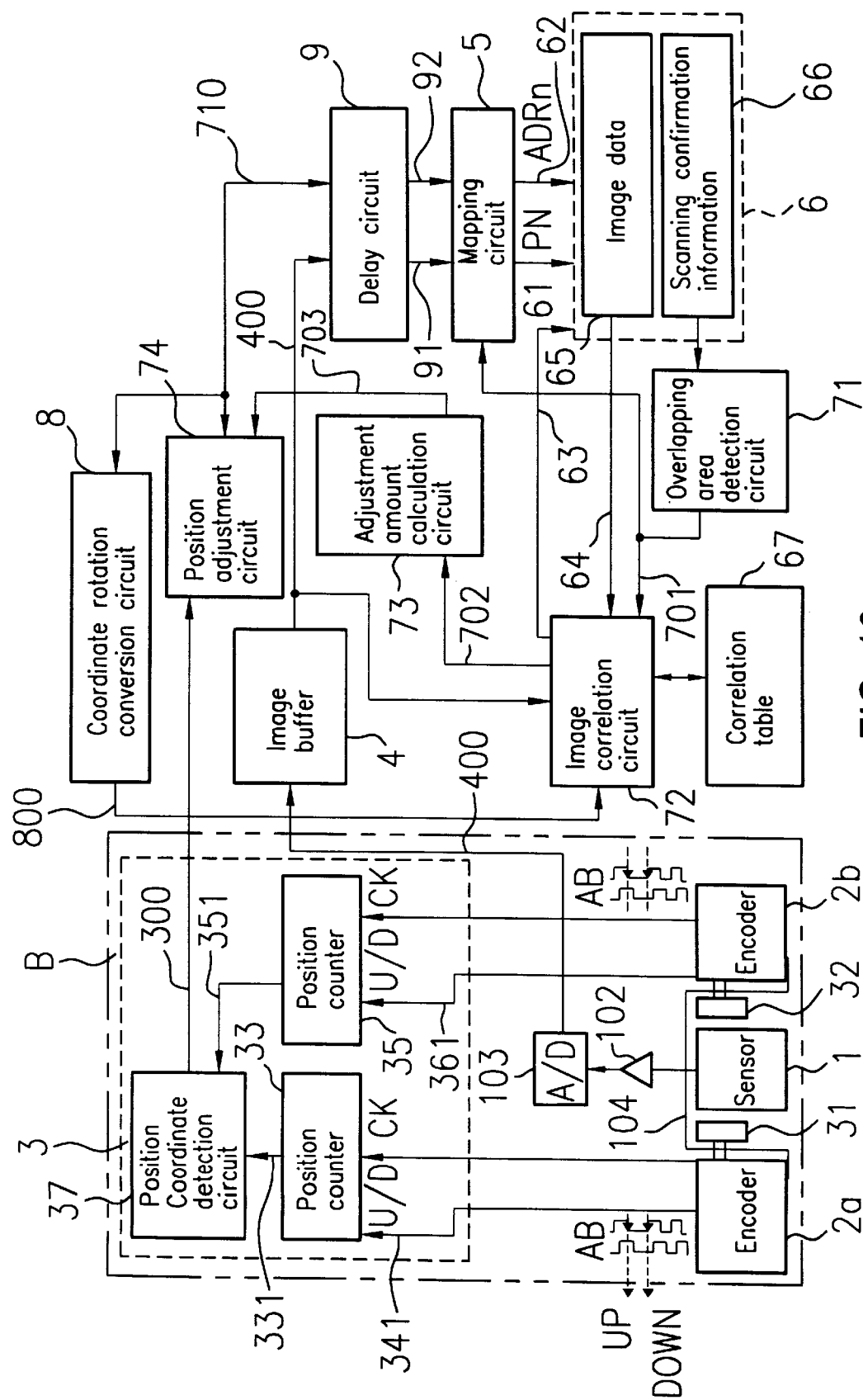
FIG. 16 is a block diagram showing an image processing apparatus and an image reading part which scans and reads an original image in a third embodiment of the invention.

With the reference also to FIG. 16, the image reading part B which scans and reads the original image complies two wheels 31, 32 equipped at both ends of the line image sensor 1 that is mounted on a body 104 of a hand-held scanner. The wheels 31, 32 have encoders 2a, 2b respectively for detecting their rotation. Encoders 2a, 2b respectively generate two-phase pulses consisting of an A-phase pulse and a B-phase pulse according to rotation angles of the wheels 31, 32, where the rotation angle pulses differ from each other by 90 degrees. Thus, the A-phase pulse and the B-phase permit detection of the rotation directions of the wheels 31, 32. Since the A-phase pulse and the B-phase pulse differ from each other in phase by 90 degrees, a level of the A-phase pulse that is detected by the rising of the B-phase pulse is distinguished according to the rotation directions of the wheels 31, 32 into a "H" level and a "L" level. When the "L" level of signals 341, 361 is determined to be in the forward direction (upwards) of the wheels 31, 32, the "H" level becomes the backward direction (downwards) of the wheels 31, 32. When the signals are at the "L" level, position counters 33, 35 increase a count value in accordance to the number of the B-phase pulse, and when the signals 341, 361 are at the "H" level, they reduce a count value in accordance to the number of the B-phase pulse. A position coordinate detection circuit 37 receives count values 331, 351 from the position counters 33, 35 and detects movement distances of both wheels 31, 32 respectively, while taking into consideration the rotation directions of the wheels 31, 32.

Next, as shown in FIG. 1, a scanning position detection circuit 3 calculates each coordinate of the wheels 31, 32 on the original 9 based on the movement distances of the wheels 31, 32. Furthermore, the scanning position detection circuit 3 converts the coordinates of the wheels 31, 32 into coordinates of reading pixels disposed respectively at both ends of the line image sensor 1, which are then output as a scanning position coordinate 300 to a position error detection circuit. As shown in FIG. 16, the scanning position detection circuit 3 comprises the position coordinate detection circuit 37 and position counters 33, 35. An operation of the scanning position detection circuit will be explained later in detail.

A mapping circuit 5 converts pixel density of image data 400 produced by the image buffer 4 and produces density image data 500. The position error detection circuit 7 calculates a correlation value between the density image data 500 produced by the mapping circuit 5 and storage data being stored in an image memory 6. Furthermore, the position error detection circuit 7 uses a position adjustment amount that is calculated on the basis of this correlation value of adjusting the scanning position coordinate 300, which is then supplied to the mapping circuit 5 as an adjusted position coordinate 710. The mapping circuit 5 uses the adjusted position coordinate 710, to form an address in the image memory 6. Then, the mapping circuit 5 stores each pixel data of the density image data 500 via a bus 600 into the image memory 6. An operation of the mapping circuit 5 and the position error detection circuit 7 will be explained later in detail.

Next, an operation of the scanning position detection circuit 3 will be explained more in detail.

Figure 2:
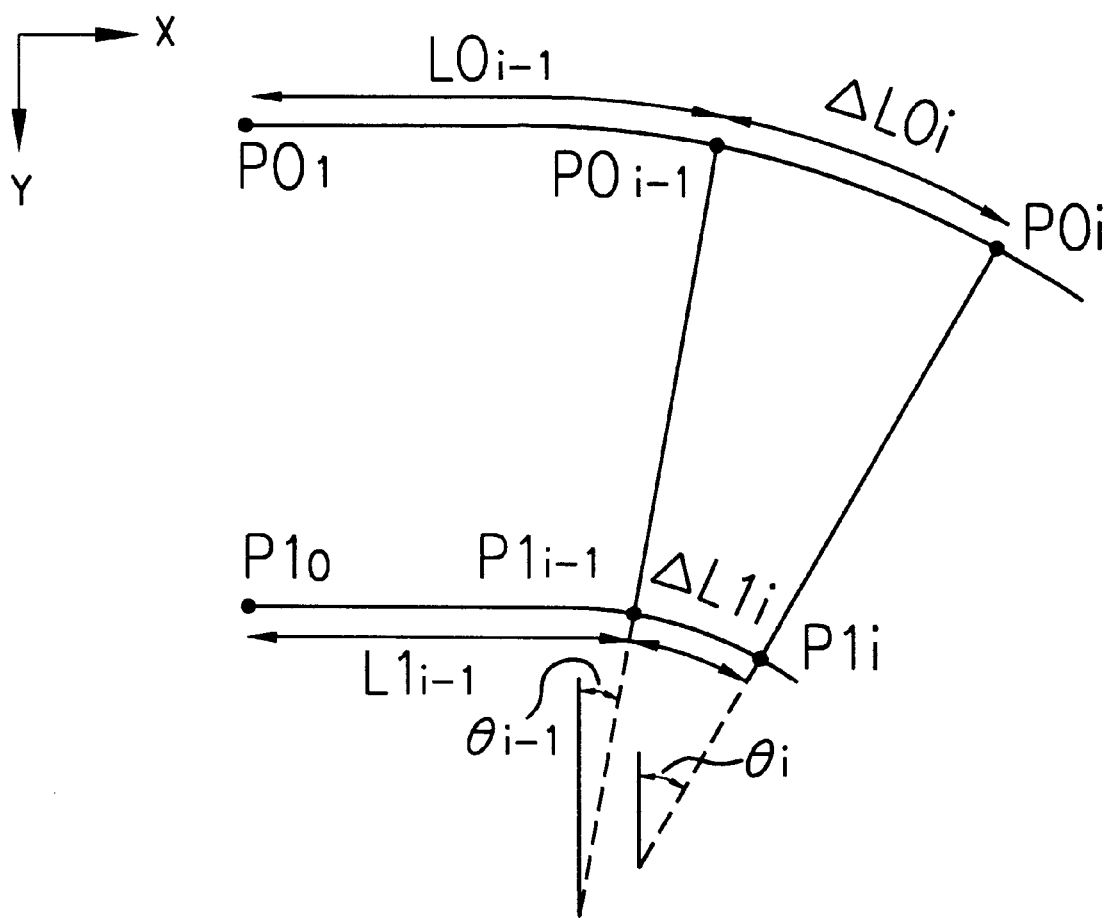
FIG. 2 is a schematic view showing an operation of a position detection circuit in the embodiment of FIG. 1.

FIG. 2 illustrates an operation of a scanning position detection circuit. In FIG. 2, thick lines show movement tracks of the two wheels 31, 32. Coordinates showing the positions of the two wheels 31, 32 at the time when the line image sensor 1 (FIG. 1) read pixel data in the i line are respectively described as $P0_i(X0_i, Y0_i)$, $P1_i(X1_i, Y1_i)$. Here, provided that coordinates of $P0_{i-1}$, $P1_{i-1}$ are already known, coordinates of $P0_i$, $P1_i$ are calculated approximately by using the following Formula 1:

$$\theta_{i-1} = (L0_{i-1} - L1_{i-1})/D$$

$$X0_i = X0_{i-1} \Delta L0_i \cdot \cos \theta_{i-1}$$

$$Y0_i = Y0_{i-1} + \Delta L0_i \cdot \sin \theta_{i-1}$$

$$X1_i = X0_i - D \cdot \sin \theta_{i-1}$$

$$Y1_i = Y0_i + D \cdot \cos \theta_{i-1}$$

In this formula and elsewhere throughout this description, represents an operation of multiplication, and "/" represents an operation of division. $L0_{i-1}$ shows a movement distance of the wheels 31, 32 moved while reading from the start to the (i-1) line. $\Delta L0_i$ shows a movement distance of the wheels 31, 32 moved while reading from the (i-1) line to the i line. Since the movement distances take rotation directions of the wheels 31, 32 into consideration, the values can be negative. Furthermore, the movement distances of the wheels 31, 32 on the original 9 can be obtained by using a number of pulse N of the encoders 2a, 2b as well as a resolution P per one pulse (in, for examples, units of inch/pulse), and by calculating P×N. The position coordinate detection circuit 37 reads the count values 331, 351 of the position counters 33, 35 in synchronization with the reading period of the line image sensor 1 and detects the movement distance $\Delta L0_i$ on the original 9 including the rotation directions of the wheels 31, 32 from a difference between the count values detected at the i line and the (i−1) line. D represents a distance between the wheel 31 and the wheel 32. Formula 1 mentioned above is an approximate calculation, assuming that $\Delta\theta=|\theta_i-\theta_{i-1}|=|\Delta L0_i-\Delta L1_i|/D$ is 0. $\Delta\theta$ shows an angle change of the line image sensor 1 while the line image sensor 1 scans one line. By using Formula 1 mentioned above, if coordinates of the two wheels 31, 32 at the start of reading are once determined, it is possible to calculate coordinates from the movement distances of the two wheels 31, 32.

Figure 3:
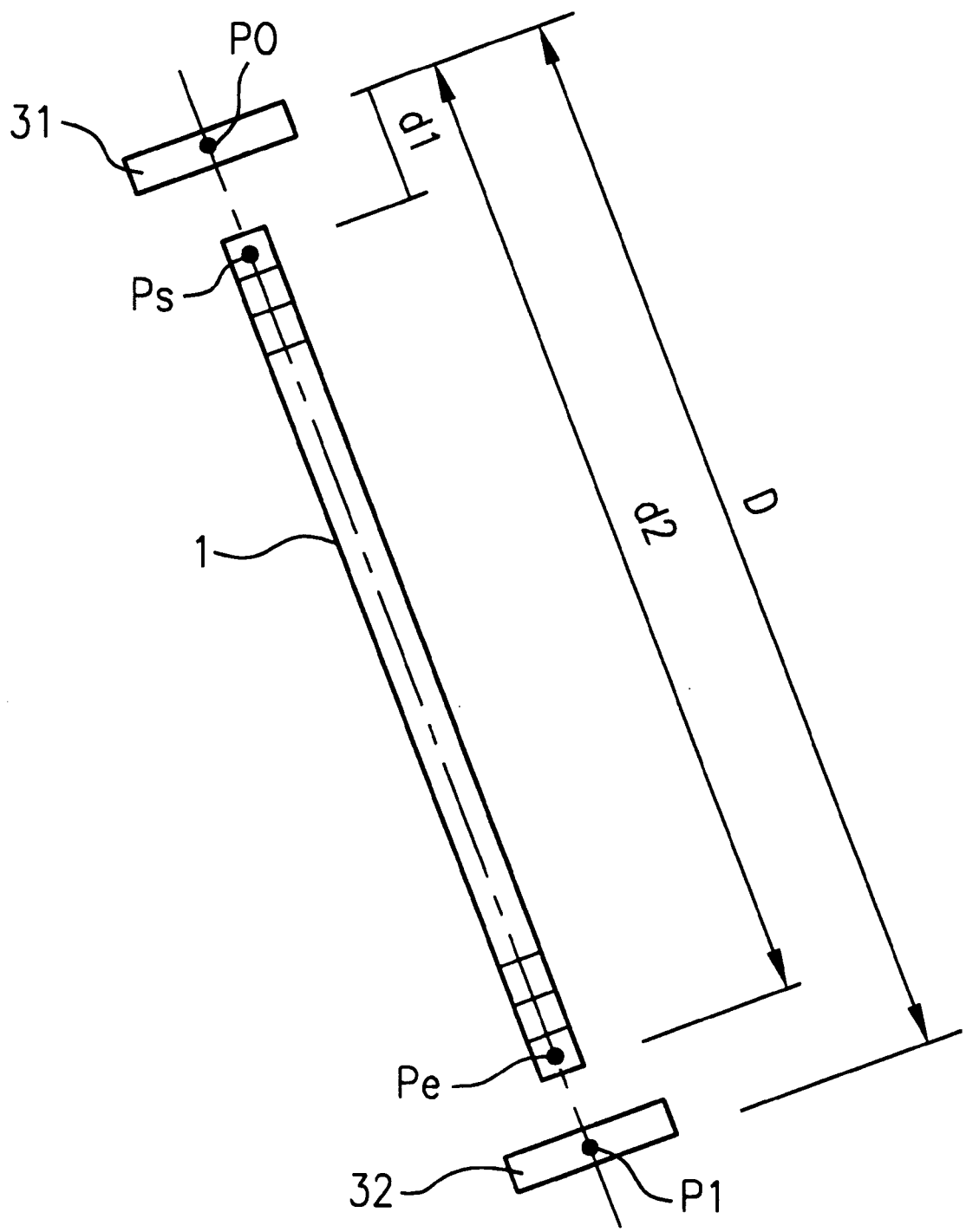
FIG. 3 is a schematic view showing coordinate calculation of reading pixels provided at both ends of a line image sensor in the embodiment of FIG. 1.

FIG. 3 illustrates a coordinate calculation of reading pixels provided at both ends of a line image sensor. A coordinate of the wheel 31 is determined to be P0(X0, Y0), and a coordinate of the wheel 32 is determined to be P1(X1, Y1). Coordinates Ps(Xs, Ys) and Pe(Xe, Ye) of pixels disposed at both ends of the line image sensor 1 are calculated by solving the following Formula 2:

$Xs=X0+(X1-X0)\cdot d1/D$ $Ys=Y0+(Y1-Y0)\cdot d1/D$ $Xe=X0+(X1-X0)\cdot d2/D$ $Ye=Y0+(Y1-Y0)\cdot d2/D$ In this formula, D represents a distance between the wheel 31 and the wheel 32; d1 represents a distance from the wheel 31 to the pixel Ps; and d2 represents a distance from the wheel 31 to the pixel Pe.

The scanning position detection circuit 3 makes use of the movement distances of the wheels 31, 32 obtained from the two-phase pulses generated by the encoders 2a, 2b, and performs the above-mentioned operations of Formula 1 and Formula 2. Then, the coordinates Ps(Xs, Ys) and Pe(Xe, Ye) of the read pixels disposed at both ends of the line image sensor 1 are supplied to the position error detection circuit 7 as the scanning position coordinate 300.

Figure 4:
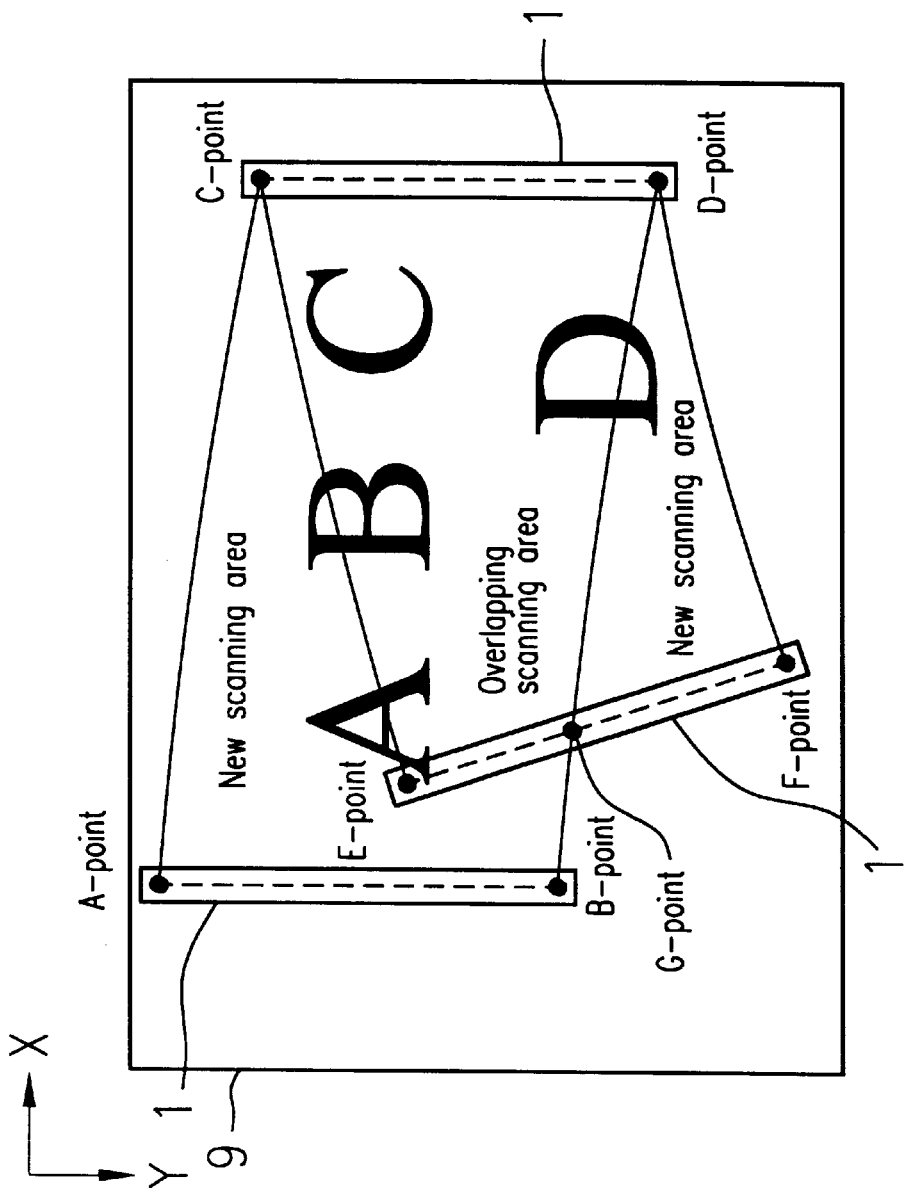
FIG. 4 is a schematic view showing scanning areas of a line image sensor in the embodiment of FIG. 1.

FIG. 4 illustrates scanning areas of a line image sensor. By referring to FIG. 4, a movement of a line image sensor 1 scanning by an hand-operation will be explained, provided that a reading area of an original 9 is wider than a length of the line image sensor 1. For reading the original 9, an operator puts a main body of a hand-held scanner in contact with the original 9 and moves it by hand on the surface of the original 9. At this time, two wheels 31, 32 disposed at the main body of the hand-held scanner rotate, and two-phase pulses are output from the encoders 2a, 2b. FIG. 4 shows areas on the original 9 being read by the line image sensor 1.

Since the line image sensor 1 cannot scan the breadth extreme of the original 9, an image reading part B (FIG. 1) reads the entire original 9 as the line image sensor 1 moves across the original 9. Although only positions of end pixels of the line image sensor 1 are indicated in FIG. 4, the line image sensor 1 reads an image present on a line connecting the end pixels in the line image sensor 1. For example, when the end pixels of the line image sensor 1 are positioned at point A and B, the line image sensor 1 reads the line between point A and B (hereinafter, this is referred to as a "reading position A–B").

In FIG. 4, the line image sensor 1 starts scanning from the reading position A–B and scans to a reading position C–D. Picture image data inside an area ABCD formed by connecting points A, B, C and D is read, and each pixel contained in this image data is stored into the image memory 6 by a mapping circuit 5 (FIG. 1) based on the scanning position coordinate 300 by scanning position detection circuit 3 (FIG. 1). Hereinafter, this area is referred to as a "new scanning area".

Next, the line image sensor 1 moves in the backward direction and scans from the reading position C–D to a reading position E–F. An area CDGE formed by connecting points C, D, G and E is an area in which the images overlap. Hereinafter, this area which is read redundantly is referred to as an "overlapping scanning area". An area DGF formed by connecting D-point, G-point, and F-point is a new scanning area. In this way, the overlapping scanning area CDGE, a new scanning area ABGEC, and the new scanning area DFG are present.

If the scanning position coordinate 300 does not have a position error, each pixel inside the reading image data can be mapped and stored in the image memory 6. In other words, even if the image data being read in the overlapping scanning area CDGE is overwritten in the image memory 6, an image being read inside the image memory 6 shows no discrepancy at a part where the new scanning area ABGEC and the overlapping scanning area (CDGE are joined together. However, the scanning position coordinate 300 is influenced by accuracy of structural design of the hand-held scanner, slippage between the wheels 31, 32 and the original 9, sinking of the wheels 31, 32 into the original 9, and a variation in the width between the wheel 31 and the wheel 32 when the original is scanned in curves by hand, and therefor includes a position error. Furthermore, since the scanning position detection circuit 3 obtains movement distances of the encoders 2a, 2b by counting the two-phase pulses produced by the encoders 2a, 2b, the above-mentioned position error is accumulated. Therefore, when the image data 400 is mapped to the image memory 6 by using the scanning position coordinate 300, a discrepancy or a gap of an image arises at the above-mentioned joint part. Here, the term "map" indicates storing the image data being read into a predetermined address in the image memory 6.

In order to prevent this discrepancy of image from occurring, the position error detection circuit 7 uses the image data of the overlapping scanning area CDGE being stored in the image memory 6 and the density image data 500 to calculate a correlation value which shows a degree of correlation between these data. Furthermore, based on this correlation value, the position error detection circuit 7 calculates a position adjustment amount for adjusting the scanning position coordinate 300. The position error detection circuit 7 adjusts the scanning position coordinate 300 according to this position adjustment amount, which is then output to the mapping circuit 5 as the adjusted position coordinate 710. According to the adjusted position coordinate 710, the mapping circuit 5 forms an address so that each pixel inside the density image data 500 is mapped to the image memory 6. Pixels then are stored in the image memory 6. The procedure for extracting overlapping area CDGE is explained below.

Figures 7A, 7B:
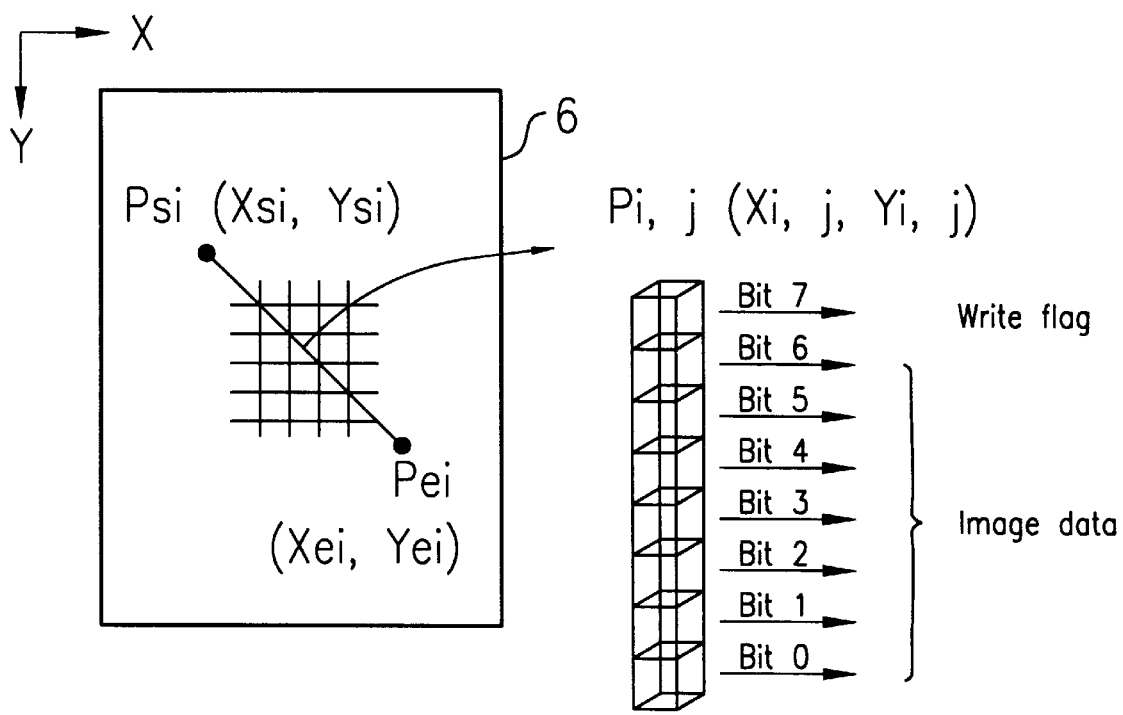
FIG. 7 is a schematic view showing an image memory in the embodiment of FIG. 1.

FIG. 7 is a schematic view showing an image memory. A bit of each pixel in the image memory 6 is comprised of a write flag storage bit (bit 7) for holding scanning confirmation information and image data storage bits (bits 0–6). Here, a number of image data storage bit is not specified, and this number can be designed according to a necessary gradation number. The described embodiment deals with an image of 128 gradations. Thus, to store variable-density data having 128 possible values, 7 bits are required for each pixel in the image memory 6. Bit 7 (the write flag) is set to "0" when image data is not written in the corresponding pixel of image memory 6 (the pixel is in an unstored condition), and the write flag is set to "1" when the image data has been written to the pixel (the pixel is in a stored condition). By sharing the memory for storing image data and the memory for storing scanning confirmation (stored/unstored) information, addresses can be formed easily and a memory control part can be simplified. Furthermore, since it is possible simultaneously access the write flag and the image data, the speed of access is improved. As an alternative, the memory for storing the image data and the memory for storing scanning confirmation information can be configured separately, and the scanning confirmation information may be stored in block unit instead of in pixel unit. It is sufficient to store scanning confirmation information which can specify a storage position of the image data.

Next, an operation of the position error detection circuit 7 will be explained.

Figure 5:
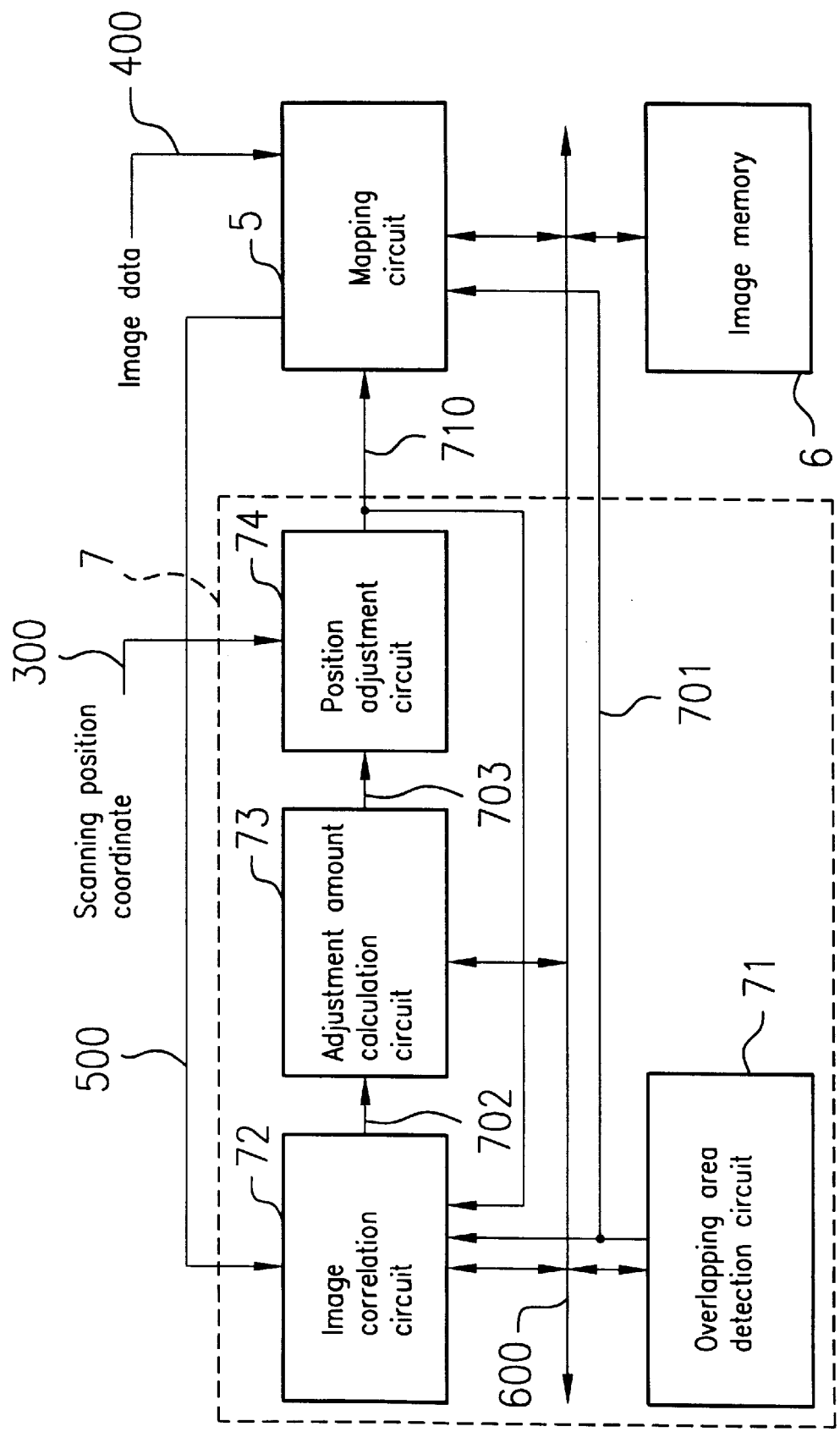
FIG. 5 is a block diagram showing a position error detection circuit in the embodiment of FIG. 1.

FIG. 5 is a block diagram showing a position error detection circuit. Before a line image sensor 1 starts scanning by reading, all the data in the image memory 6, a position adjustment amount 703 in an adjustment amount calculation circuit 73, and a correlation table inside an image correlation circuit 72 are initialized to "0". After the initialization, every time the line image sensor 1 reads and scans a line, the scanning position coordinate 300 is adjusted by the position adjustment circuit 74, and is supplied to the mapping circuit 5 as the adjusted position coordinate 710. When the line image sensor 1 starts scanning, the position adjustment amount 703 is "0", and the scanning position coordinate 300 and the adjusted position coordinate 710 have the same coordinate value.

The mapping circuit 5 densifies the image data 400 by a conversion process of pixel density and produces the density image data 500. Furthermore, the mapping circuit 5 uses the adjusted position coordinate 710 to calculate a storage address ADRn for use in storing each pixel Pn of the density image data 500 in the image memory 6. According to the address ADRn, the mapping circuit 5 reads the pixel data Pn which is stored in the address ADRn of the image memory 6 by way of the bus 600, and this pixel data Pn is supplied to an overlapping area detection circuit 71 via the bus 600. Operation of the mapping circuit 5 will be explained below.

The overlapping area detection circuit 71 checks the write flag (bit 7) of the pixel data Pn, and determines whether image data is already stored in the address ADRn of the pixel data Pn. When the write flag (bit 7) of the pixel data Pn is a 1, it indicates that image data is already stored in the address ADRn, and the pixel data Pn is designated as being included in an overlapping scanning area. Furthermore, when the write flag (bit 7) of the pixel data is a 0, the pixel data Pn is designated as being included in a new scanning area. The overlapping area detection circuit 71 supplies a judgement signal 701 to the image correlation circuit 72 and to the mapping circuit 5. In this case, the judgement signal 701 is a signal which indicates "0" when the pixel data Pn is included in a new scanning area, and "1" when the pixel data Pn is included in an overlapping scanning area.

The image correlation circuit 72 performs a correlation value calculation process on the pixel data Pn when the judgement signal 701 indicates "1", and does not perform such a process when the judgment signal 701 indicates "0". The mapping circuit 5 stores the density pixel data Pn into the image memory 6 when the judgement signal 701 is "0", and otherwise does not store the density pixel data Pn into the image memory 6. This processing operation is conducted for all of the pixel data included in one line of the density image data 500.

When the above-mentioned processing of the density image data 500 for one line is completed, the image correlation circuit 72 uses a correlation table which was formed by conducting a correlation value calculation process for pixels included in the overlapping scanning area to detect a position error direction of the scanning position coordinate 300. Furthermore, the image correlation circuit 72 supplies an offset value 702 to the adjustment amount calculation circuit 73 for cancelling the position error. When all of the density pixels in one line are included in the new scanning area, the correlation table of the image correlation circuit 72 remains of the initial value of "0". In this instance, the offset value 702 results in "0" (no position error).

The adjustment amount calculation circuit 73 adds the offset value 702 to an accumulated value of adjustment amounts, which is then supplied to a position adjustment circuit 74 as the position adjustment amount 703. The position adjustment circuit 74 adds the scanning position coordinate 300 of image data for the next line to be processed and the position adjustment amount 703, which is then output to the mapping circuit 5 as the adjusted position coordinate 710. Thereafter, the above-mentioned process is repeated sequentially for every line.

Figure 6:
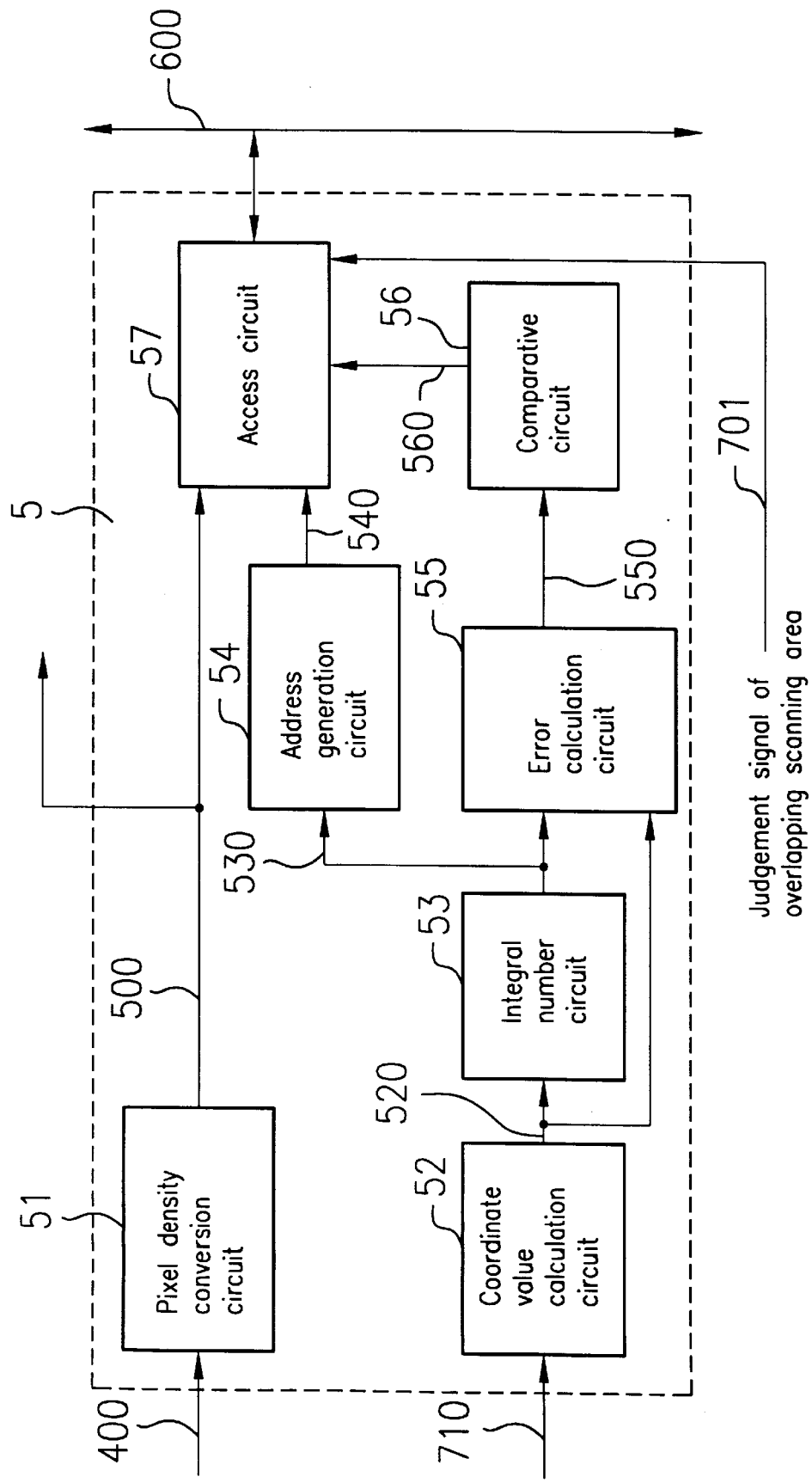
FIG. 6 is a block diagram showing a mapping circuit in the embodiment of FIG. 1.

Next, an operation of the mapping circuit 5 will be explained by referring to FIGS. 6, 7, and 9. FIG. 6 is a block diagram showing a mapping circuit; FIG. 7 illustrates an image memory; and FIGS. 9A and 9B illustrate a pixel density conversion.

As shown in FIG. 6, a pixel density conversion circuit 51 produces three interpolation pixels against one pixel data contained in the image data 400, and generates the density image data 500 which is densified twice as much.

First, a method of producing an interpolation pixel will be explained with reference to FIGS. 9A and 9B. In FIGS. 9A and 9B, $P_{i,j}$ indicates the j pixel data in the i line of image data in the image data 400. A black dot shows a coordinate point in each pixel data. FIG. 9A shows four adjacent pixels in the image data 400. In FIG. 9(b), $Q_{i,j}$, $R_{i,j}$ and $S_{i,j}$ represent interpolation pixel data against the pixel data $P_{i,j}$ contained in the image data 400. The interpolation pixel data $Q_{i,j}$, $R_{i,j}$, and $S_{i,j}$ are respectively calculated by using the following Formula 3:

$$Q_{i,j}=(P_{i,j}+P_{i,j+1})/2$$

$$R_{i,j}=(P_{i,j}+P_{i-1,j})/2$$

$$S_{i,j}=(P_{i,j}+P_{i,j+1}+P_{i-1,j+1})/4$$

Next, a coordinate value calculation circuit 52 will be explained. As shown in FIG. 6, the adjusted position coordinate 710 which is a coordinate value after the adjustment of both end pixels in the line image sensor 1 is input to the coordinate value calculation circuit 52. The coordinate value calculation circuit 52 uses the adjusted position coordinate 710 being input to calculate a coordinate value 520 of each pixel in the density image data 500. An operation of the coordinate value calculation circuit 52 will be explained by referring to FIG. 7, wherein coordinates (adjusted position coordinate 710) of both end pixels $Ps_i$ and $Pe_i$ in the line image sensor 1 are respectively indicated as $(Xs_i, Ys_i)$ and $(Xe_i, Ye_i)$. A suffix i shows that this is an adjusted position coordinate in the i line of the image data 400. Here, it is determined such that reading pixel density of the line image sensor 1 is 8 pixels/mm, and pixel density of an image stored in the image memory 6 is 8 pixels/mm. $Xs_i$, $Ys_i$, $Xe_i$, and $Ye_i$ represent real values with a unit of ⅛ mm.

A coordinate $(XP_{i,j}, YP_{i,j})$ of the pixel data $P_{i,j}$ is calculated by using the following formula (Formula 4), wherein Nd represents a number of pixels being read in one line by the line image sensor 1, and j represents a pixel number inside one line:

$$XP_{i,j}=Xs_i+j\cdot(Xe_i-Xs_i)/(Nd-1)$$

$$YP_{i,j}=Ys_i+j\cdot(Ye_i-Ys_i)/(Nd-1)$$

Coordinates $(XQ_{i,j}, YQ_{i,j})$, $(XR_{i,j}, YR_{i,j})$, and $(XS_{i,j}, YS_{i,j})$ of the three interpolation pixel data $Q_{i,j}$, $R_{i,j}$, and $S_{i,j}$ corresponding to the pixel data $P_{i,j}$ are calculated by using the following Formula 5:

$$XQ_{i,j}=(XP_{i,j}+XP_{i,j+1})/2$$

$$YQ_{i,j}=(YP_{i,j}+YP_{i,j+1})/2$$

$$XR_{i,j}=(XP_{i,j}+XP_{i-1,j})/2$$

$$YR_{i,j}=(YP_{i,j}+YP_{i-1,j})/2$$

$$XS_{i,j}=(XP_{i,j}+XP_{i,j+1}+XP_{i-1,j}+XP_{i-1,j+1})/4$$

$$YS_{i,j}=(YP_{i,j}+YP_{i,j+1}+YP_{i-1,j}+YP_{i-1,j+1})/4$$

The coordinate value calculation circuit 52 calculates the coordinate value 520 of each pixel inside the density image data 500 by conducting the operation processes shown as Formula 4 and Formula 5 above.

An integral number circuit 53 converts the coordinate value 520, which is a real value, into an integral number and produces an integral number coordinate value 530. When the real number coordinate value 520 is described as $(X_{real}, Y_{real})$ and the integral number coordinate value 530 is described as $(X_{int}, Y_{int})$, the integral number coordinate value is calculated by using the following Formula 6:

$$X_{int}=[X_{real}+0.5]$$

$$Y_{int}=[Y_{real}+0.5]$$

In Formula 6, [ ] indicates an operation of truncating the non-integer portion. A process of truncating a non-integer portion adding 0.5 is equivalent to an operation of rounding off.

Figure 10:
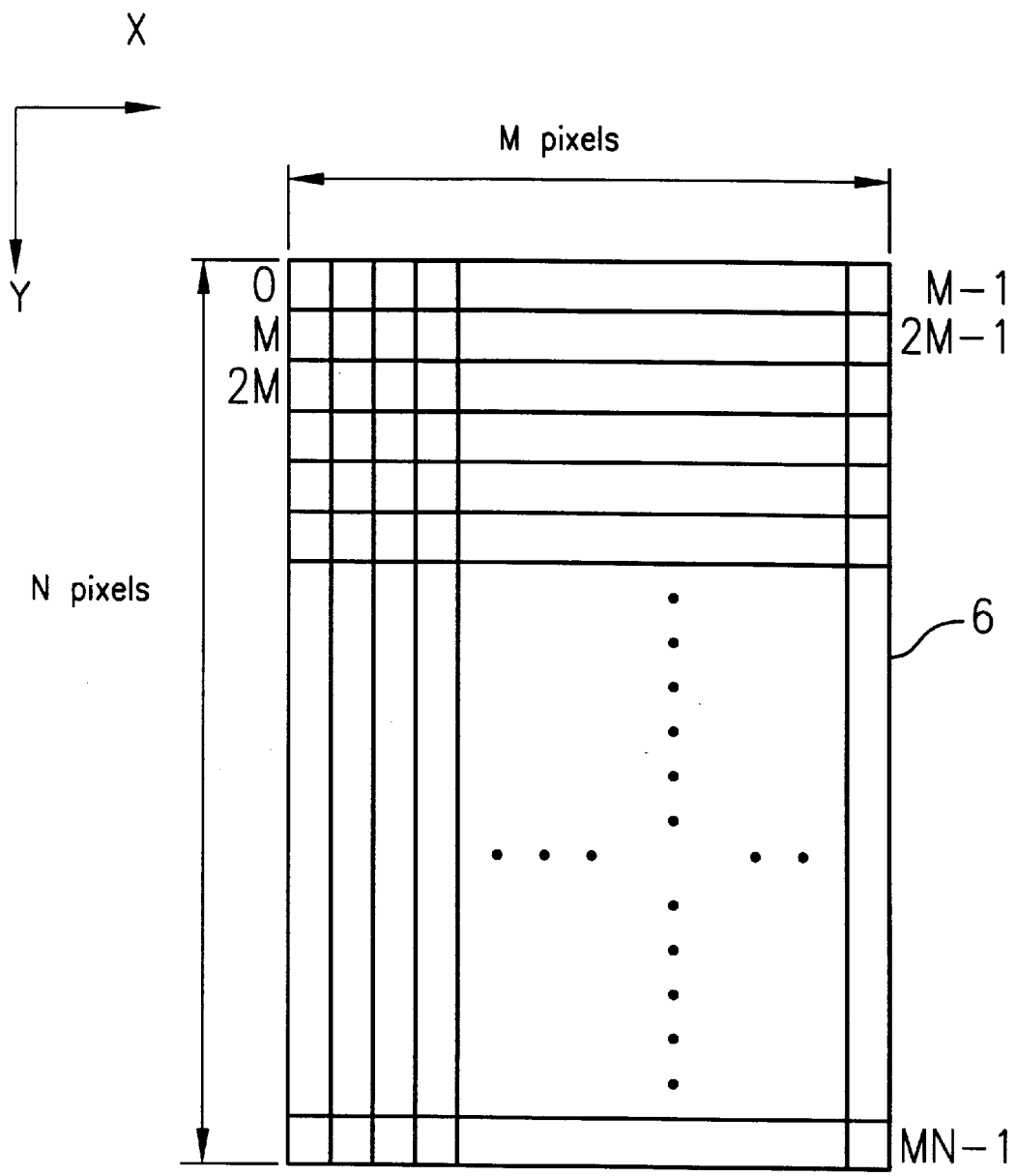
FIG. 10 is a schematic view showing an arrangement of addresses in an image memory of the embodiment of FIG. 1.

An address generation circuit 54 converts the integral number coordinate value 530 produced by the integral number circuit 53 to an address 540 in the image memory 6. FIG. 10 shows an arrangement of addresses in an image memory. The image memory 6 is a page memory comprising M pixels in the X direction and N pixels in the Y direction. An address of a pixel on the upper left side of the image memory 6 is 0, an address of a pixel on the upper right side is (M−1), and an address of a pixel on the lower right side is (MN−1). When the integral number coordinate value 530 is described as $(X_{int}, Y_{int})$, the address ADR in the image data 6 is calculated by using the following Formula 7:

$$ADR=X_{int}+M\cdot Y_{int}$$

The real number coordinate value 520 and the integral number coordinate value 530 are supplied to an error calculation circuit 55 that supplies a coordinate error 550 to a comparative circuit 56. When a coordinate error in the X direction is indicated as Ex, and a coordinate error in the Y direction is indicated as Ey, a coordinate error (Ex, Ey) is calculated by using the following Formula 8:

$$Ex=|X_{real}-X_{int}|$$

$$Ey=|Y_{real}-Y_{int}|$$

In this formula, ∥ indicates an operation of obtaining an absolute value. Hereinafter, ∥ is used as an operator for obtaining an absolute value. Ex and Ey have values between 0 and 0.5.

The comparative circuit 56 compares the coordinate errors Ex, Ey with predetermined values. The comparative circuit 56 supplies a signal 560 to an access circuit 57 which was a value of "1" when both coordinate errors Ex, Ey are smaller than the predetermined values mentioned above.

The access circuit 57 accesses the image memory 6 (FIG. 5) via the bus 600. An address in the image memory 6 is identified by the address 540, which is supplied by the address generation circuit 54 to the access circuit 57. The density image data 500 is stored in the image memory 6 by the access circuit 57, but only when the judgement signal 701 is "0" and the signal 560 is "1". In other words, an optional pixel contained in the density image data 500 is mapped to the image memory 6 only when this pixel is a pixel included in a new scanning area and the coordinate errors Ex and Ey are smaller than the above-mentioned predetermined values. A pixel which does not satisfy both conditions is not mapped onto the image memory 6. By not storing new image data into an area of the image memory 6 in which data is already stored, even if a scanning position including an accumulated position error is supplied, image data having a smaller accumulated position error has priority for storage in the image memory 6 at the time of sequential overlapped reading, by scanning reciprocally with one-stroke by the hands, so that images having a small scanning position error are always stored on the image memory 6. By using the storage data to detect position error, a connected composite image having less distortion can be obtained, thereby improving the quality of a image.

Figure 11C:
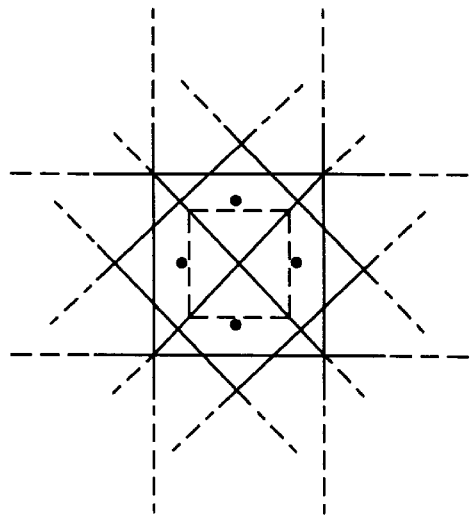
FIGS. 11A to 11C are schematic views showing a mapping operation of densification image data to an image memory in the first embodiment of this invention.
Figure 11B:
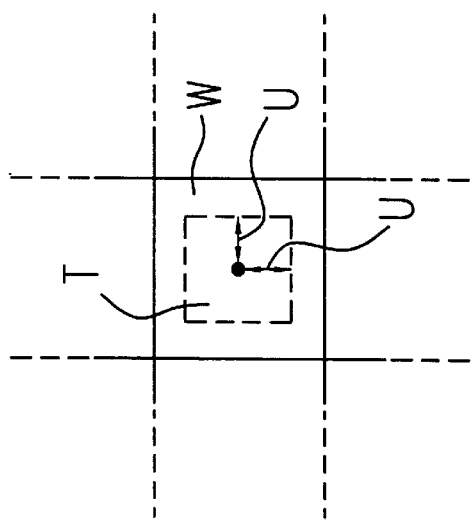
Figure 11A:
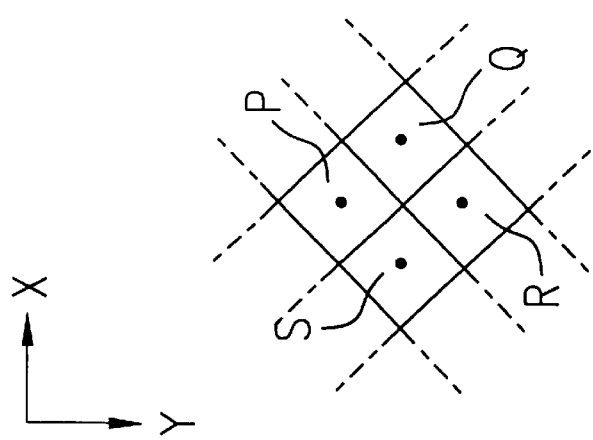

FIGS. 11A–11E illustrate mapping of density image data to an image memory. FIG. 11A shows the density image data 500. In FIG. 11A, black dots show coordinate values of pixels P, Q, R, and S respectively. Pixel density of the density image data at least 500 is 16 pixels/mm. FIG. 11B shows a pixel in the image data 6. In FIG. 11B, a black dot represents a coordinate value of a pixel W. A distance U shows a predetermined value used in the comparative circuit 56 of the mapping circuit 5. The image memory 6 stores image data having a pixel density of 8 pixels/mm. FIG. 11C shows an example, in which the density image data 500 (FIG. 11A) and the pixel in the image memory 6 (FIG. 11B) are stacked up in the same coordinate system. In case of FIG. 11C, each coordinate value of the pixels P, Q, R, and S in the density image data 500 is present outside an area T, so that name of the pixels P, Q, R, and S is not mapped to the pixel W in the image memory 6. In other words, there will be pixels present in the image memory 6 which are not mapped (map missing pixel), even though the pixels belong to an original reading area. By broadening the area T, the map missing pixels can be eliminated. However, when the area T is broadened, a coordinate error at the time of mapping becomes greater, and the image mapped onto the image memory 6 is distorted even more. In view of the distortion of the image, it is preferable that the area T be as narrow as practical.

A maximum value $U_{max}$ of the distance U for the purpose of preventing map missing pixels from arising is shown as Formula 9 below with a pixel pitch of the image memory 6 as a unit:

$$U_{max}=(2^{1/2}/2)/2=0.35$$

In this embodiment, pixel density in the image memory 6 is 8 pixels/mm, and pixel pitch is ⅛ mm. By determining the distance U to be approximately 0.35, map missing pixels can be eliminated. When emphasis is placed on reducing distortion of the image by allowing map missing pixels to arise to some degree, the distance U should be determined in the range of 0.3~0.35. If the distance U is 0.3 or less, map missing pixels occur so frequently that the quality of reproduced image deteriorates considerably.

Figures 8A, 8B:
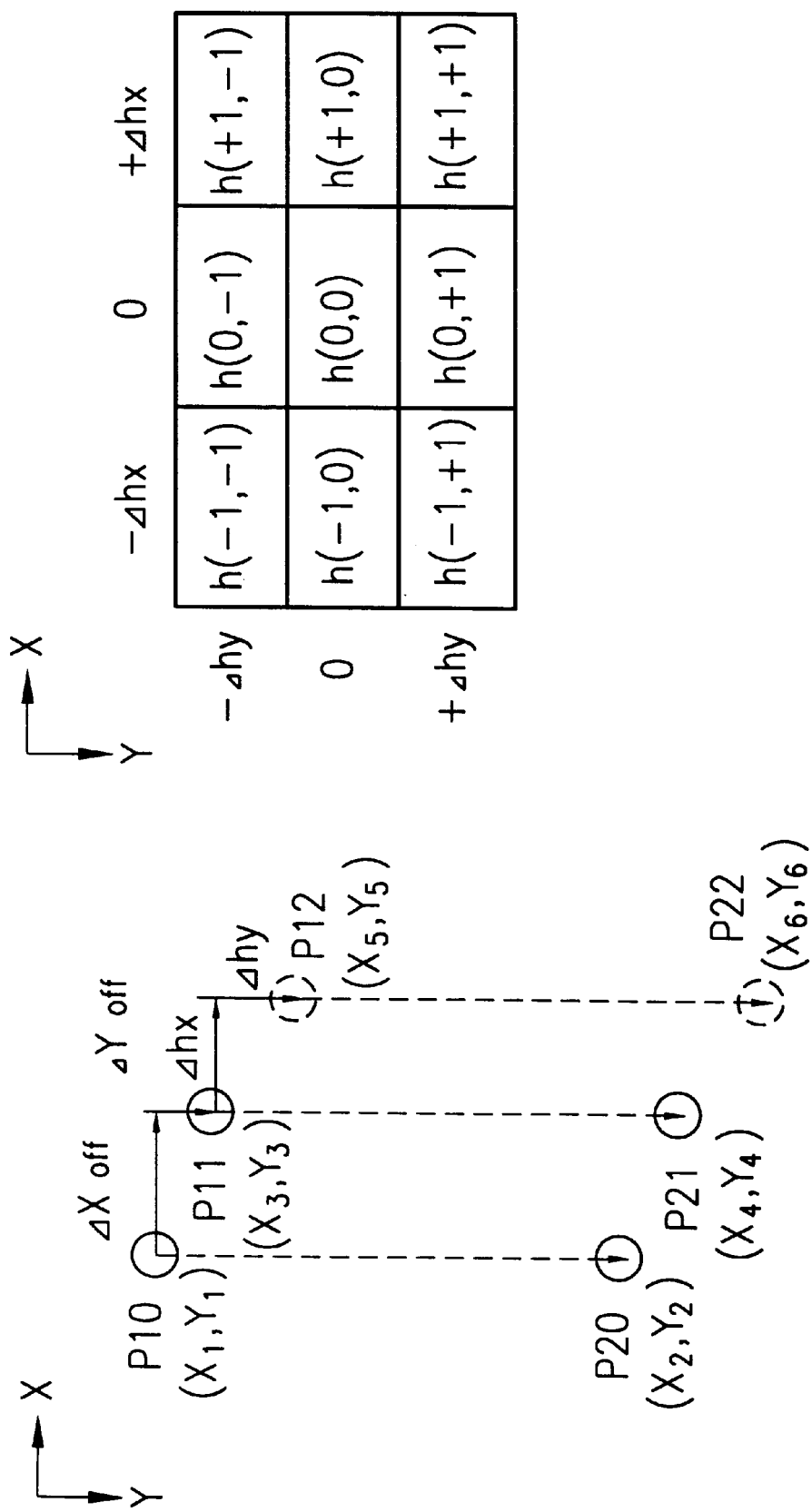
FIGS. 8A and 8B are schematic views showing a correlation table of the embodiment of FIG. 1.

Operation of the position error detection circuit 7 shown in FIG. 5 will now be explained further. FIGS. 8A and 8B illustrate a correlation table. A image correlation circuit 72 will be explained primarily by reference to FIGS. 8A, and 8B. FIG. 8A is a schematic view showing a correlation position subject to a correlation process; and FIG. 8B is a schematic view showing a correlation table. The scanning position coordinate 300 in the i line supplied to the position adjustment circuit 74 is determined as P10(X1, Y1) and P20(X2, Y2), while the position adjustment amount 703 are described as $\Delta Xoffset_i$ and $\Delta Yoffset_i$. The position adjustment circuit 74 makes use of the scanning position coordinate 300 and the position adjustment amount 703 for calculating P11 (X3, Y3) and P21 (X4, Y4) of the adjusted position coordinate 710 by using the following Formula 10.

$X3 = X1 + \Delta Xoffset_i$ $Y3 = Y1 + \Delta Yoffset_i$ $X4 = X2 + \Delta Xoffset_i$ $Y4 = Y2 + \Delta Yoffset_i$ Only when the judgement signal 701 from the overlapping area detection circuit 71 indicates "1" (namely, when the processed pixel is included in the overlapping scanning area), the image correlation circuit 72 calculates a correlation value of the processed pixel and renews the correlation table. The pixel Pn inside the image memory 6 corresponding to the coordinate of the processed pixel is determined as a target pixel. The calculation of the correlation value is conducted by calculating a differential value between the image data inside the image memory 6 corresponding to a coordinate having a micro-value being increased or reduced against the coordinate of the processed pixel, and the image data of the processed pixel.

A coordinate $(Xh_{mn}, Yh_{mn})$ of a pixel data Ph subject to calculation of a correlation value of the processed pixel is calculated by using Formula 11 mentioned below, wherein a coordinate of the target pixel Pn is determined as (Xn, Yn), and micro-coordinate values are described as $\Delta hx$ and $\Delta hy$.

$Xh = [Xn + \Delta hx + m]$ $Yh = [Yn + \Delta hy \times n]$

In this formula, m and n respectively comprise a value selected from −1, 0, and 1. Furthermore, [ ] shows an operation of rounding off to an integer.

In FIG. 8A, P12 to P22 indicate positions of one line which calculates a correlation value with m=1 and n=1. When a value of correlation table which corresponds to the coordinate subject to this correlation value calculation is described as h (m, n), the correlation table shown as FIG. 8B is formed.

Provided that the density image data 500 comprises a pixel number j inside one line and a data value $Dn_j$, and that pixel data subject to the correlation value calculation inside the image memory 6 is determined as $Dh_{jmn}$, the value h (m, n) of each correlation table is calculated by the following Formula 12:

$h(m,n) = ho(m,n) + |Dn_j - Dh_{jmn}|$

Here, ho (m, n) is a value of the correlation value table which was formed by the correlation value calculation up to the pixel number (j−1). Before the correlation value calculation of one line starts, values in the correlation table are all initialized to "0".

The image correlation circuit 72 conducts the above-mentioned correlation value calculation for all the pixels contained in one line of the density image data 500, and in this way, the image correlation circuit 72 completes the correlation table. Furthermore, the coordinate subject to the correlation value calculation is the adjusted position coordinate 710 which is calculated by Formula 10 mentioned above.

When the calculation of the correlation value for one line is completed, the image correlation circuit 72 retrieves $(m_{min}, n_{min})$, which holds the minimum value of h (m, n), and supplies this value to the adjustment amount calculation circuit 73 as the offset value 702. When there are multiple minimum values present in the correlation table, and when the minimum values include $(m_{min}, n_{min})=(0, 0)$, the minimum value of (0, 0) is given priority. The fact that the correlation value i $(m_{min}, n_{min})$ in the correlation table is small indicates that when a micro-value of $(\Delta hx \times m_{min}, \Delta hy \times n_{min})$ is added to the coordinate of each pixel for mapping, images inside the image memory 6 and images of a line to be mapped next correspond to each other most suitably. In addition, when a plurality of minimum values are present and when these minimum values include the center of a correlation window, the offset value 702 is set as "0". For example, a correlation window comprising 3×3 has h (0, 0) as its center. Here, m and n respectively comprise a value selected from −1, 0, and 1.

The adjustment amount calculation circuit 73 performs an operation shown as the following formula (Formula 13) by using the offset value 702 of $(m_{min}, n_{min})$. In this formula, the offset value 702 is described as $\Delta X = \Delta hx \times m_{min}$ and $\Delta Y = \Delta hy \times n_{min}$:

$\Delta Xoffset_i = \Delta Xoffset_{i-1} + \Delta X$ $\Delta Yoffset_i = \Delta Yoffset_{i-1} + \Delta Y$ In Formula 13 mentioned above, a suffix i indicates the adjustment position amount 703 when the correlation table in the i line of the density image data 500 is completed. The position adjustment circuit 74 adjusts the scanning position coordinate 300 by adding ($\Delta Xoffset_i$, $\Delta Yoffset_i$) to the scanning position coordinate 300, which is then produced as the adjusted position coordinate 710.

According to the configuration of the image processing apparatus in the embodiment mentioned above, even if a position error is included in the scanning position supplied, a position error of the scanning position may be deleted from image information consisting of image data and storage data for an overlapping scanning area which is scanned redundantly. Thereafter, the position error may be adjusted. Next, by storing the image data into the image memory 6 based on this adjusted scanning position, gaps caused by the position error in the scanning position are prevented. In this way, distortion of images that are connected together inside the image memory 6 can be reduced.

In addition, this embodiment refers to nine pixel positions subject to correlation, but it is not necessarily limited to nine positions. When position error may be large, the number of pixel positions subject to correlation can be increased to broaden a correlation range. Furthermore, a correlation table may be formed at an interval of N(N>1) scanning lines, and a position error may be adjusted at an interval of N(N>1) scanning lines. For example, it may be N=8.

EXAMPLE 2

Next, as a second embodiment of the invention, a process will be explained in which an offset value 702 corresponding to a position error detected by an image correlation circuit 72 (FIG. 5) is large.

When the offset value 702 corresponding to the position error detected by the image correlation circuit 72 is large, a position adjustment amount 703 changes significantly at a position where the offset value 702 is added. As a result, an adjusted position coordinate 710 changes significantly at the position being adjusted.

Figure 15:
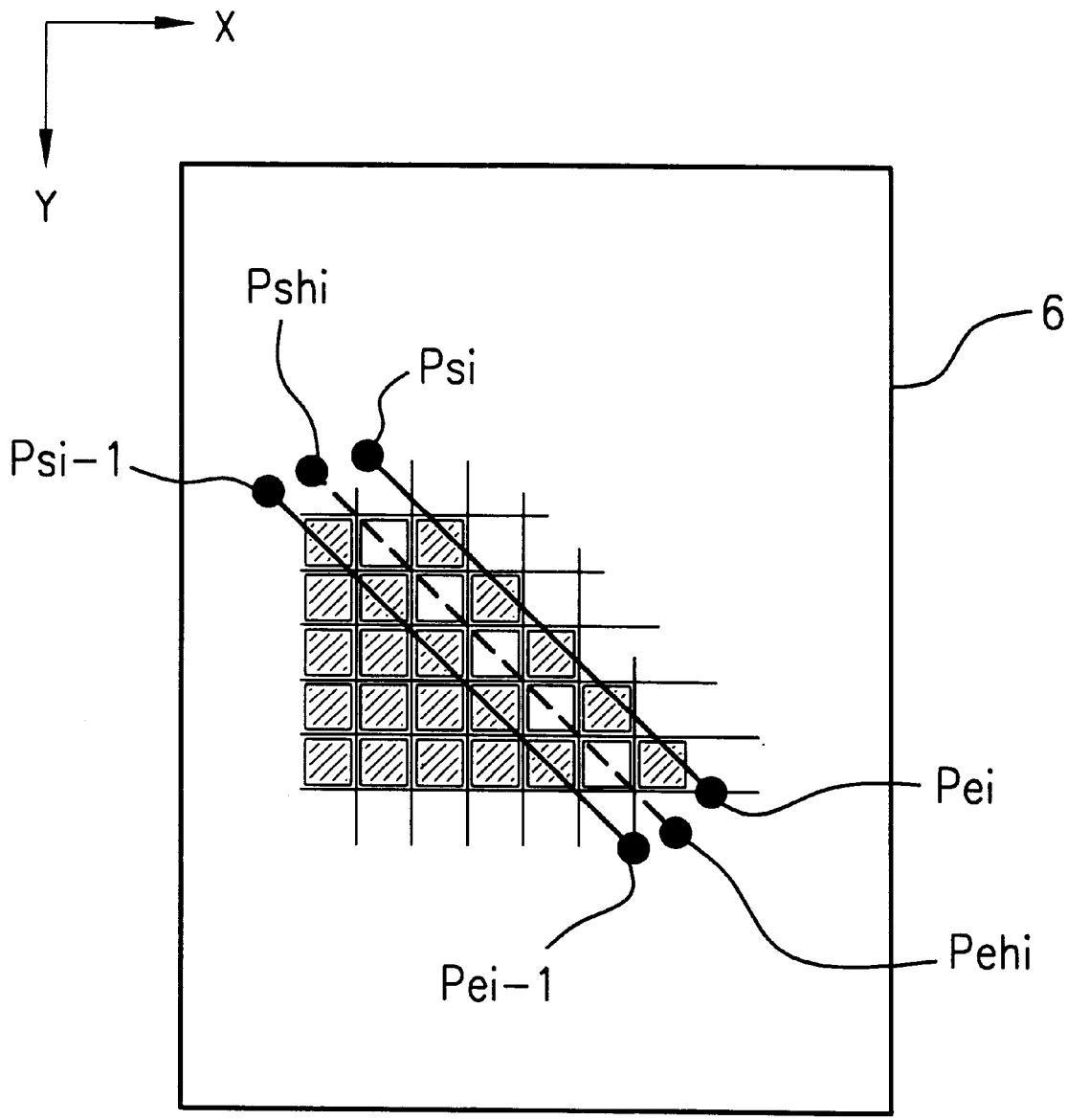
FIG. 15 is a schematic diagram showing storage condition of data in an image memory of the embodiment of FIG. 12.

A storage condition of data in an image memory 6 will be explained by referring to FIG. 15, in which the adjusted position coordinate 710 changed significantly. FIG. 15 is a schematic diagram showing a storage condition of data in an image memory. In FIG. 15, the (i−1) line is determined as a line for conducting an image correlation detection, and the i line is determined as a line for conducting a position adjustment. Furthermore, both end pixels in the (i−1) line are indicated as $Ps_{i-1}$, $Pe_{i-1}$, and both end pixels in the i line are indicated as $Ps_i$, $Pe_i$.

As shown in FIG. 15, when a mapping circuit 5 stores image data into the image memory 6 in accordance with the adjusted position coordinate 710 at a position where an adjusted amount changes greatly, an area arises between the (i−1) Line and the i line, in which data is not stored (map missing area caused by a position adjustment).

Figure 12:
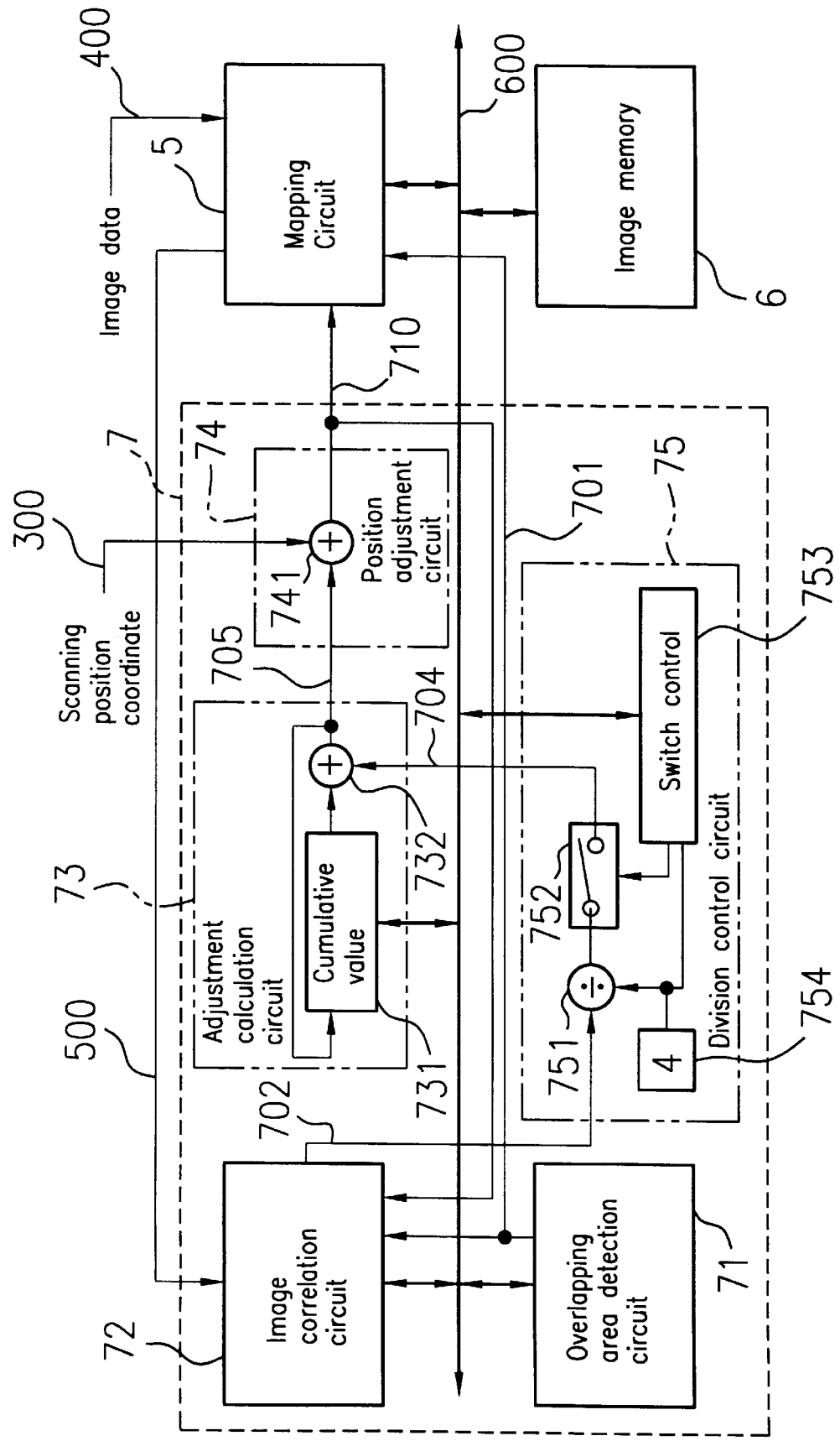
FIG. 12 is a block diagram showing a position error detection circuit including a division control circuit in a second embodiment of the invention.
Figure 13:
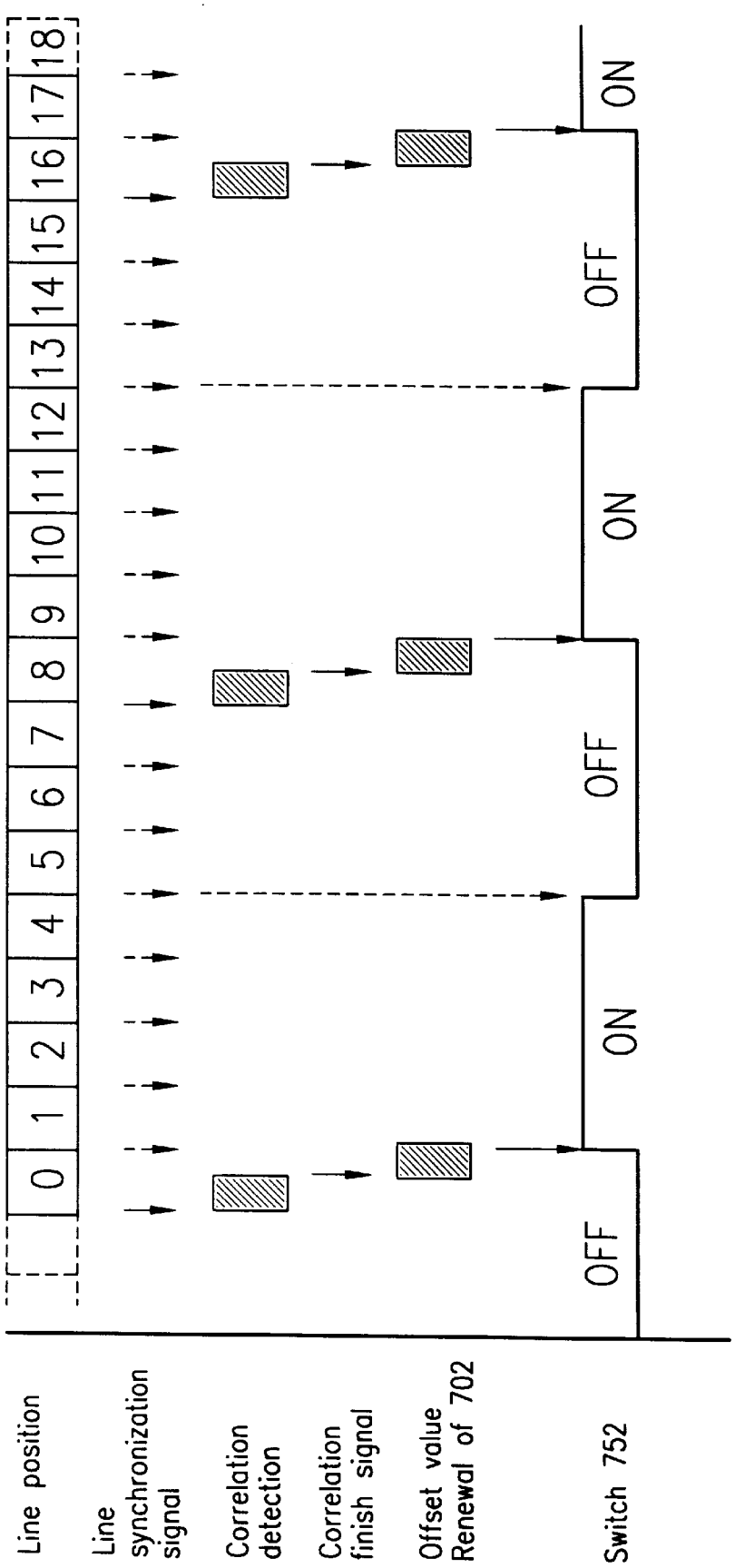
FIG. 13 is a timing chart of a division control circuit in the embodiment of FIG. 12.
Figure 14:
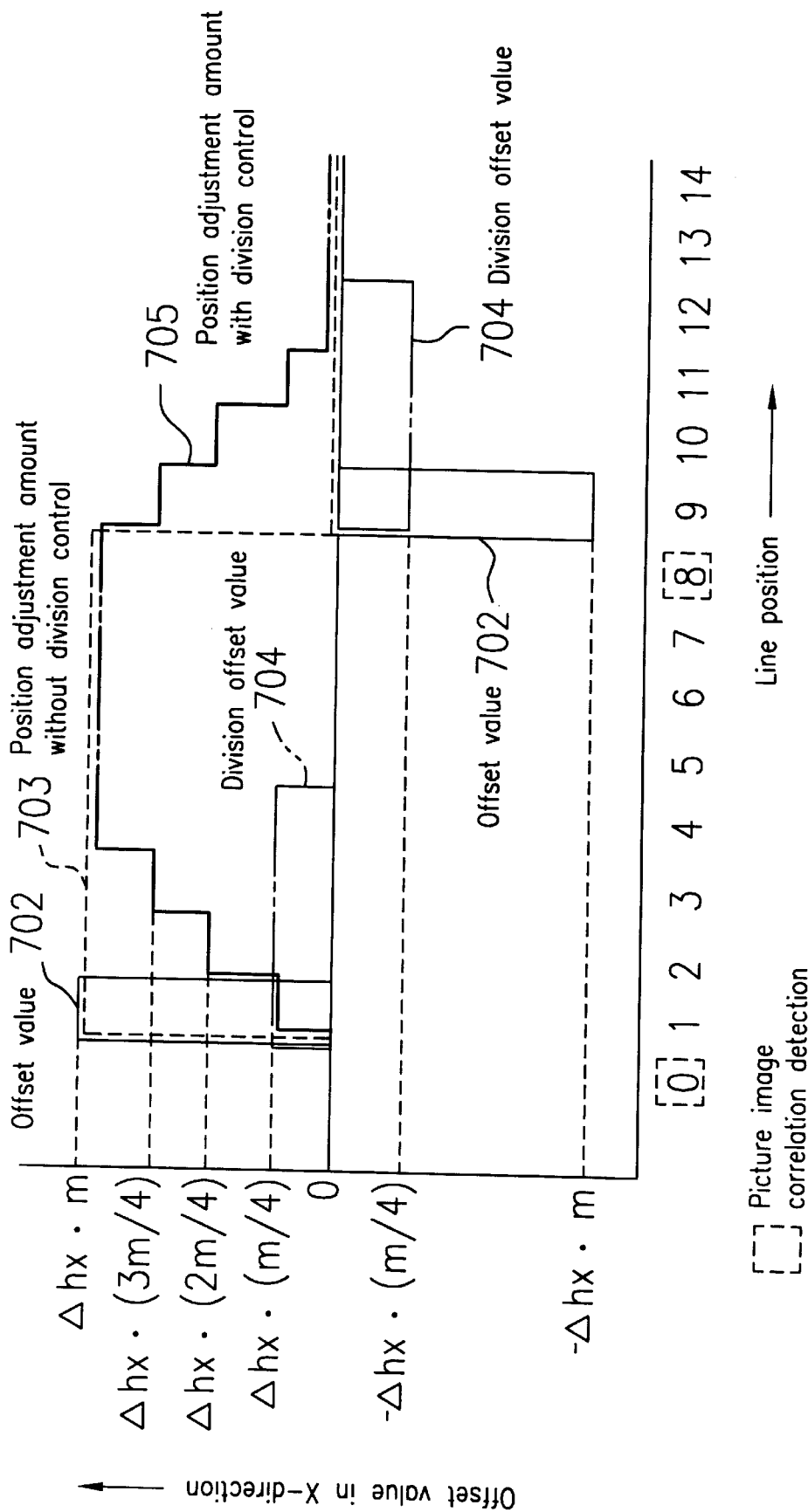
FIG. 14 is a graph showing differences between position adjustment amount and division position adjustment amount in the embodiment of FIG. 12.

A method of preventing this area without storage data from arising will be explained with particular reference to FIGS. 12, 13, and 14. FIG. 12 is a block diagram showing a position error detection circuit including a division control circuit; FIG. 13 is a timing chart of a division control circuit; and FIG. 14 is a schematic diagram showing a difference between a position adjustment amount and a division position adjustment amount.

FIG. 12 differs from FIG. 5, which is a block diagram showing a position error detection circuit 7, in that the offset value 702 of the image correlation circuit 72 is not directly produced to an adjustment amount calculation circuit 73. After the offset value 702 is converted by a division control circuit 75 to a division offset value 704 which prevents an area without storage data (map missing area caused by a position adjustment) from arising, the offset value 702 is then supplied to the adjustment amount calculation circuit 73.

To prevent the map missing area caused by a position adjustment from arising, a parameter NB that divides the offset value 702 is stored in a register 754. The offset value 702 is divided by the division parameter NB stored in the register 754 in a division circuit 751, and a switch 752 selects an ON/OFF output of the division circuit 751 by a control-output of a switch control 753. When it is "ON", a division offset value 704 is produced by the division circuit 751, and when it is "OFF", the division offset value 704 is not produced (no offset value). When the division parameter NB is $2^n$, the division circuit 751 can be formed as a n-bit shift. In addition, the division parameter NB is not specified and can be determined optionally according to a maximum value that can be attained by the offset value 702.

Next, an operation of the division control circuit 75 will be explained according to the timing chart of FIG. 13. In this explanation, the division parameter NB equals 4. Furthermore, a line position where an image correlation is first conducted is set as the i line, and an image correlation is detected at an interval of eight scanning lines. FIG. 13 shows only numbers of the line positions, for example, the i line is indicated as 0 (line position) and the (i+8) line is indicated as 8 (line position).

When all of the image signals in one line being read by a line image sensor 1 are mapped, the mapping circuit 5 supplies a line synchronization signal of one line by way of a bus 600 to the division control circuit 75 and the image correlation circuit 72.

When the first line position where a scanning starts is determined as an initialized line position (line position of i=0), the image correlation circuit 72 counts the line synchronization signal from the initialized line position. Then, when a remainder of a counting number i divided by 8 is 0, an image correlation is detected (excluding the initialized line position of i=0), and before the next line position is read, the offset value 702 is renewed in synchronization to the line synchronization signal. When the detection of image correlation is over, the image correlation circuit 72 supplies a correlation finish signal by way of the bus 600 to the switch control 753 of the division control circuit 75. The switch control 753 considers the next line position of the line position where the correlation finish signal of the image correlation circuit 72 is received as 1 in a counting value, and a line synchronization signal is counted beginning from the next line position. In correspondence to the division parameter NB held by the register 754, the switch control 753 turns the switch 752 ON when "1≦count value≦4", and the switch control 753 turns the switch 752 OFF when "count value>4".

The adjustment amount calculation circuit 73 receives a division offset value 704 being divided, and adds a cumulative value of the register 731 which stored a position adjustment amount 705 for the previous line and the division offset value 704 with an adder 732, which is then supplied to a position adjustment circuit 74 as the position adjustment amount 705 being division-controlled (hereinafter referred to as a "division position adjustment amount").

Next, regarding the adjustment amount calculation circuit 73, a difference between the position adjustment amount 703 produced from the offset value 702 (without division control, FIG. 5) and the division position adjustment amount 705 produced from the division offset value 704 (with division control) will be explained by referring to FIG. 14.

Similar to FIG. 13, a line position where an image correlation is first conducted is set as the i line, and the image correlation is detected at an interval of eight scanning lines. FIG. 14 shows only numbers of the line positions, for example, the i line is indicated as 0 (line position) and the (i+8) line is indicated as 8 (line position). Also, the offset value 702 for cancelling a position error is indicated in the X-direction only, since the same process is applied in both the X-direction and the Y-direction. Furthermore, as for the i line position, a cumulative value of the register 731 in the adjustment amount calculation circuit 73 is determined as "0", and a division number of the register 754 in the division control circuit 75 is determined here as 4. When a correlation window of 3×3 is determined, the division number is sufficient with 4 in this way. When a correlation window of 5×5 is determined, the division number is sufficient with 8. The term "variable control amount" indicates the division offset value 704.

In FIG. 14, since image correlation detection is conducted in the i line and in the (i+8) line, the offset value 702 of the image correlation circuit 72 is produced in the (i+1) line (offset value=Δh×m) and in the (i+9) line (offset value=−Δh×m).

When a division control is not conducted (FIG. 5), the adjustment amount calculation circuit 73 produces the offset value 702, and the position adjustment amount 703 is obtained in the next (i+1) line by adding a cumulative value of the register 731 (cumulative value=0) and Δh×m of the offset value. Similarly, the adjustment amount calculation circuit 73 obtains the position adjustment amount 703 in the (i+9) line by adding a cumulative value of the register 731 (cumulative value=Δhx×m) and −Δhx×m of the offset value.

When a division control is conducted, the adjustment amount calculation circuit 73 produces the offset value 704, and the division position adjustment amount 705 is obtained in the next (i+1) line by adding a cumulative value of the register 731 (cumulative value=0) and Δhx×(m/4) of the offset value. Furthermore, the adjustment amount calculation circuit 73 obtains the division position adjustment amount 705 in the (i+2) line by adding a cumulative value of the register 731 (cumulative value=Δhx×(m/4)) and Δhx×(m/4) of the offset value. In the same way, the division position adjustment amount 705 is obtained up to the (i+4) line by sequentially adding Δhx×(m/4). As for the (i+4) line to the (i+8) line, the division offset value 704 becomes 0, and there is no change. In addition, the adjustment amount calculation circuit 73 obtains the division position adjustment amount 705 in the (i+9) line by adding a cumulative value of the register 731 (cumulative value=Δhx×m) and −Δhx×(m/4) of the offset value. In the same way, the division position adjustment amount 705 is obtained from the (i+9) line to the (i+12) line by sequentially reducing −Δhx×(m/4). From the (i+13) line, the division offset value 704 becomes 0, and there is no change.

When a division control is not conducted, a detection of the large offset value 702 leads to a large increase or decrease of the position adjustment amount 703 in the (i−1) line and in the next i line where the detection of image correlation continues. Therefore, as shown in FIG. 15, an area without storage data (map missing area due to an adjustment) arises between the (i−1) line and the i line.

On the other hand, when division control is conducted, even if a large offset value 702 is detected, the division control circuit 75 divides the offset value 702 for each Line, so that the division position adjustment amount 702 increases or decreases gradually in the (i−1) line and in the next i line where the image correlation is detected. Therefore, as shown in FIG. 15, the hi line which is determined by the division control is put between the (i−1) line and the i line in case of "no division control", so that an area without storage data (map missing area due to an adjustment) is prevented from arising in the lines between the (i−1) line and the i line. In this instance, the hi line is described as both end pixels $Ps_{hi}$, $Pe_{hi}$.

Furthermore, when a range subject to correlation is broadened, a scanning position is adjusted by a large offset value, so that an area without storage data (map missing area due to an adjustment) arises frequently. In this case, by conducting a division control, an area without storage data (map missing area due to an adjustment) in the image memory 6 can be prevented, which leads to improvement in accuracy of position error detection when an image correlation is detected. As a result, the quality of an image being reproduced in the image memory 6 is improved.

In addition, by increasing a number of pixels through density of input image data, by mapping only pixels with less coordinate error at the time of mapping into an image memory and by conducting a division control, pixels which are not mapped in the image memory 6 are reduced considerably. Also, distortion of reproduced images being read, which is caused by coordinate conversion errors at the time of mapping, is reduced greatly. Further, because it is not necessary to increase the number of pixels in the line image sensor 1 and also to reduce a maximum manual scanning speed, quality of images in the image memory 6 is improved even more.

As mentioned above, according to the configuration of the image processing apparatus of the invention, it is possible to variably control an adjustment value for adjusting a position error at a predetermined rate, to adjust a scanning position based on the adjustment value being stepwise varied and also to store image data into the image memory 6 based on the data of the adjusted scanning position. Thus, an area in which image data inside the image memory 6 is not stored due to the adjustment of scanning position can be prevented. Furthermore, the scanning position is not radically adjusted, and a detection range of a correlation value therefore can be reduced when a position error is detected from image information consisting of image data and storage data. In this way, a circuit can be reduced. In addition, since it is possible to prevent an area from arising in which image data in the image memory 6 is not stored (map missing), an error in the correlation value can be reduced at the time when a position error is detected from image information consisting of image data inside an overlapping scanning area and storage data, so accuracy of position error detection can be improved. As a result, the quality of images being reproduced inside the image memory 6 is improved. Furthermore, when the image processing apparatus of this invention is constructed out of hardware, processing can be sequentially conducted one line at a time, so that a circuit can be reduced, thereby enabling real-time processing.

In this embodiment, the density image data 500 which is the input image data 400 being densified was used, and after the number of pixels was increased, only pixels with less coordinate errors at the time of mapping were mapped to the image memory 6. Undensified image data 400 also may be used. In this instance, division control can be used to prevent an unmapped area from arising. Furthermore, when a judgement of coordinate error at the time of mapping is 0.5 (in other words, when a coordinate error at the time of mapping is rounded off), either the input image data 400 ($P_{i,j}$) or the density image data 500 may be mapped to the image memory 6 in such a way that $R_{i,j}$ produced between scanning lines is always stored (FIGS. 9A, 9B). In this way, even if a distance which is wider than an acceptable distance arises between scanning lines, an area without image data being stored (map missing area) can be prevented from arising.

EXAMPLE 3

As mentioned above, the first and the second embodiments referred to a position error detection against the X-direction and the Y-direction of a scanning position. In this embodiment, a position error detection against the rotation direction of the scanning position is added. This embodiment will be explained with reference to FIGS. 16, 17, and 18.

In the configuration shown in FIG. 3, reasons for causing a position error can be named as follows: slipping of wheels 31, 32 on the surface of an original; accuracy error between a diameter of the wheel 31 and a diameter of the wheel 32; accuracy error in a distance D between the wheels 31, 32; sinking of the wheels 31, 32 into an original; a rotation center being influenced by a width between the wheels 31, 32 when rotated with a manual scanning, and so on. Therefore, by adding a position error against the rotation direction as a subject of adjustment, a position error can be adjusted with excellent accuracy.

A image reading part B shown in FIG. 16 is the same as that in Example 1. FIG. 16 differs from Example 1 in that a coordinate rotation conversion circuit 8 is added for detecting a position error against a rotation direction, and a delay circuit 9 is added for improving accuracy of position error detection. Incidentally, this delay circuit 9 is effective in improving adjustment accuracy of position error also in Example 1 and in Example 2. This effect will be explained later.

An image processing apparatus shown in FIG. 16 receives a scanning position coordinate 300 as a unit with image data 400 corresponding to a scanning position and obtained from the image reading part B.

An analog output of a line image sensor 1 is amplified by an amplifier 102 and then converted to digital image data by an A/D converter 103. The digital image data is first stored in an image buffer 4. The image buffer 4 produces the corresponding image data 400 in synchronization with the scanning position coordinate 300.

An adjustment amount calculation circuit 73 accumulates and holds an offset value 702 produced by an image correlation circuit 72.

A position adjustment circuit 74 adjusts a position error of the scanning position coordinate 300 by a position adjustment amount 703 being produced by the adjustment amount calculation circuit 73 which accumulates and holds position errors, and then produces the adjusted position error as an adjustment scanning position coordinate 710.

The delay circuit 9 delays the adjustment scanning position coordinate 710 and the image data 400 of the scanning line corresponding to the adjustment scanning position coordinate 710 with a scanning line as a unit.

A mapping circuit 5 produces a memory address 62 (ADRn) of each pixel data 61 (Pn) in one scanning line from coordinate data 92 of the adjustment scanning position coordinate 710 being delayed. Then, the mapping circuit 5 stores the pixel data 61 (Pn) which is subject to mapping among delayed image data 91 into a storage area (memory 65) of image data in the image memory 6.

Similar to the first embodiment, when the image memory 6 is configured as shown in FIG. 7, a write flag memory bit (bit 7) which holds scanning confirmation information of the image data, corresponds to a memory 66, and image data memory bits (bit 0~6) correspond to a memory 65. Therefore, an overlapping area detection circuit 71 judges an overlapping area being scanned redundantly from the scanning confirmation information being stored in the memory address 62 (ADRn) of the memory 66, and the overlapping area detection circuit 71 produces a judgement signal 701 of the overlapping scanning area.

The judgement signal 701 checks the write flag (bit 7) of the pixel Pn and judges whether the image data is already stored in the address 62 (ADRn) of the pixel data 61 (Pn). When bit 7 of the pixel data 61 (Pn) is 1, this indicates that the image data from the line image sensor 1 is already stored in the memory address 62 (ADRn), so that the pixel data 61 (Pn) is judged as being included in an overlapping scanning area. Furthermore, when bit 7 of the pixel data 61 (Pn) is 0, the pixel data 61 (Pn) is judged as being included in a new scanning area. The overlapping area detection circuit 71 supplies the judgement signal 701 to the image correlation circuit 72 and to the mapping circuit 5. In this case, the judgement signal 701 is a signal which shows "0" when the pixel data 61 (Pn) is included in a new scanning area, and which shows "1" when the pixel data 61 is included in an overlapping scanning area.

The mapping circuit 5 stores the pixel data 61 (Pn) into the memory 65 when the judgement signal 701 is "0". On the other hand, the mapping circuit 5 does not store the pixel data 61 (Pn) into the memory 65 when the judgement signal 701 is "1". A series of this processing operation with one pixel as a unit is conducted for all of the pixels of the image data 91 in one scanning line.

The coordinate rotation conversion circuit 8 produces a correlation coordinate 800 which has a direction with the inclination of a micro-angle$\Delta\phi$ against the adjustment scanning position coordinate 710 [Ps-Pe] to the image correlation circuit 72 with one scanning line as a unit.

The image correlation circuit 72 produces a correlation detection address 63 of the pixel Pn which is subject to each correlation detection of one scanning line from coordinate data of the correlation coordinate 800. Then, the image correlation circuit 72 reads storage data 64 from a storage area (memory 65) of the image data in the image memory 6, and at the same time, the image correlation circuit 72 reads scanning confirmation information corresponding to the storage data 64 being stored from the memory 66, which is then supplied to the overlapping area detection circuit 71.

The overlapping area detection circuit 71 judges an overlapping area being scanned redundantly from the scanning confirmation information of the memory 66, and produces the judgement signal 701 for the overlapping scanning area.

The image correlation circuit 72 conducts a correlation value calculation process of the pixel Pn when the judgement signal 701 is "1". On the other hand, when the judgment signal 701 is "0", a correlation value calculation process of the pixel Pn is not conducted.

Figure 17:
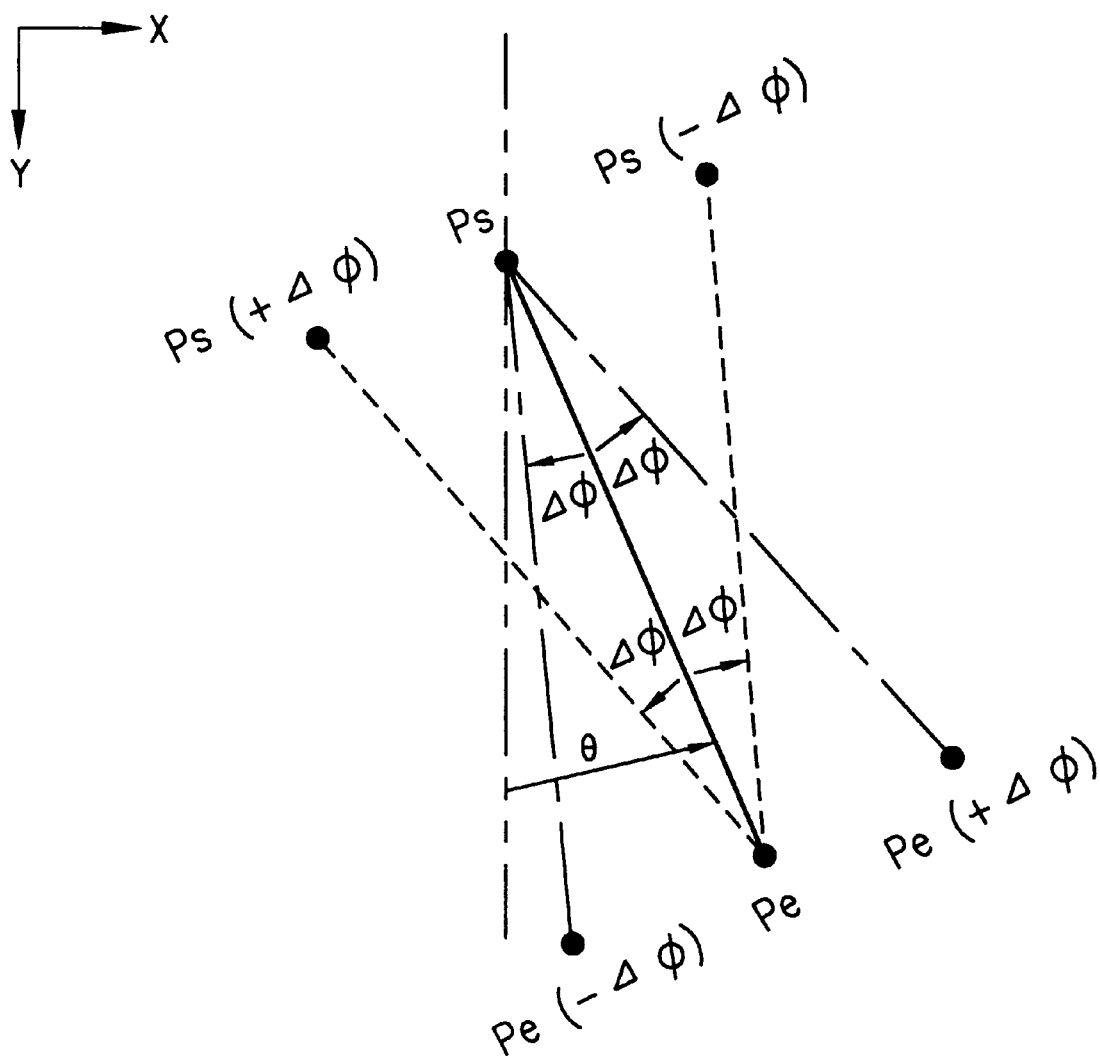
FIG. 17 is a schematic diagram showing angle adjustment in the embodiment of FIG. 16.

As shown in FIG. 17, a position error in the rotation direction can be detected in the image correlation circuit 72 by adding the correlation detection process of the correlation coordinate [Ps-Pe($\pm\Delta\phi$)] which has the direction with the inclination of the micro-angle $\Delta\phi$ against the scanning position coordinate 300 [Ps-Pe] or of the correlation coordinate [P($\pm\Delta\phi$)-Pe]. In this way, a position error adjustment can be attained with even higher accuracy. When this is combined with a correlation table value h (m, n) in the above-mentioned first embodiment, the correlation table value becomes h (l, m, n). Here, l has a value selected from −1, 0, and 1. A correlation table comprising three patterns in the angle direction (rotation direction) and nine patterns in the position direction (X, Y directions) which result in formation of a total of 27 patterns. When a minimum value of the correlation table is h (l, m, n), an adjustment amount of the angle $\Delta\phi$ offset$_i$ is produced by performing a calculation of l·$\Delta\phi$. Here, $\Delta\phi$ is, for example, 0.2 degrees. The values of l, m, and n are not specified, and are instead determined by the required position error adjustment accuracy. When the values of l, m, and n are increased, an area for conducting correlation becomes broader, and adjustment accuracy improves.

As shown in FIG. 16, the rotation direction of position error is detected by converting rotationally a coordinate of the adjustment scanning position coordinate 710 using the coordinate rotation conversion circuit 8, and either the correlation coordinate 800 [Ps-Pe($\pm\Delta\phi$)], which has the direction with the inclination of the micro-angle $\Delta\phi$ against the scanning position coordinate 300 [Ps-Pe], or the correlation coordinate 800 [Ps($\pm\Delta\phi$)-Pe] is produced.

The image correlation circuit 72 repeats the operations of the above-mentioned formulas (Formula 10 to Formula 12) using the correlation coordinate 800 which has the direction with the inclination of the micro-angle $\Delta\phi$ by the rotation conversion. Accordingly, a correlation table 67 having 27 patterns is formed. Here, l, m, and n have a value respectively selected from −1, 0, and 1.

Using this correlation table 67, the offset value 702 for adjusting a position error is detected.

When a calculation of a correlation value against each angle of one scanning line is over, the image correlation circuit 72 retrieves ($l_{min}$, $m_{min}$, $n_{min}$), which holds the minimum value of h (l, m, n), and supplies it to the adjustment amount calculation circuit 73 as the offset value 702. If there are multiple minimum values present in the correlation table 67, and if ($l_{min}$, $m_{min}$, $n_{min}$)=(0, 0, 0) is included in these minimum values, the minimum value of (0, 0, 0) is used. The fact that the correlation value h ($l_{min}$, $m_{min}$, $n_{min}$) in the correlation table 67 is the smallest indicates that when a micro-value of ($\Delta\phi \times l_{min}$, $\Delta h \times m_{min}$, $\Delta hy \times n_{min}$) is added to a coordinate of each pixel for mapping, image information between the storage data inside the image memory 6 and the image data of a line to be mapped next correspond to each other most suitably. Furthermore, if there are multiple minimum values present, and if the center of a correlation window is included in these minimum values, the X-direction and the Y-direction of the offset value 702 are determined as 0. For example, the center of the correlation window comprising 3×3 is h (1, 0, 0).

The adjustment amount calculation circuit 73 uses the offset value 702 ($l_{min}$, $m_{min}$, $n_{min}$) for the following operation (Formula 14). In this formula, the offset value 702 is determined as $\Delta X = \Delta h \times m_{min}$, $\Delta Y = hy \times n_{min}$, $\Delta \psi = \Delta \phi \times l_{min}$:

$$\Delta Xoffset_i = \Delta Xoffset_{i-1} + \Delta X$$

$$\Delta Yoffset_i = \Delta Yoffset_{i-1} + \Delta Y$$

$$\Delta \phi offset_i \Delta \phi offset_{i-1} + \psi$$

In Formula 14 mentioned above, a suffix i indicates the position adjustment amount 703 when a correlation table in the i line of the image data 400 is completed.

A position adjustment circuit 74 adjusts the scanning position coordinate 300 by adding ($\Delta Xoffset_i$, $\Delta Yoffset_i$, $\Delta \phi offset_i$) to the scanning position coordinate 300, which is then produced as the adjustment scanning position coordinate 710.

The scanning position coordinate 300 in the i line received by the position adjustment circuit 74 is determined as Ps (Xs, Ys), Pe (Xe, Ye). The position adjustment amount 703 is determined as $\Delta Xoffset_i$, $\Delta Yoffset_i$, $\Delta \phi offset_i$. The position adjustment circuit 74 uses the scanning position coordinate 300 to calculate Psh (Xsh, Ysh), Peh (Xeh, Yeh) of the adjustment scanning position coordinate 710 by using Formula 15 mentioned below:

$$Xsh = Xs + \Delta Xoffset_i$$

$$Ysh = Ys + \Delta Yoffset_i$$

$$Xeh = Xs + \Delta Xoffset_i + (Nd-1) \cdot \sin(\theta + \Delta \phi offset_i)$$

$$Yeh = Ys + \Delta Yoffset_i + (Nd-1) \cdot \cos(\theta \Delta \phi offset_i)$$

$$\theta = a\sin[(Xe-Xs)/(Nd-1)]$$

In this formula, the rotation center on the coordinate is always the coordinate Ps. Furthermore, asin [ ] represents a function of conducting an arcsine operation. Nd indicates a number of pixels being read in one line by the line image sensor 1. The rotation center on the coordinate may be determined as Pe. Also, both rotation conversions with the coordinate Ps as the rotation center on the coordinate and with the coordinate Pe as the rotation center on the coordinate may be conducted. By conducting both rotation conversions, a position error corresponding to both of the wheels 31, 32 can be detected.

Figure 18C:
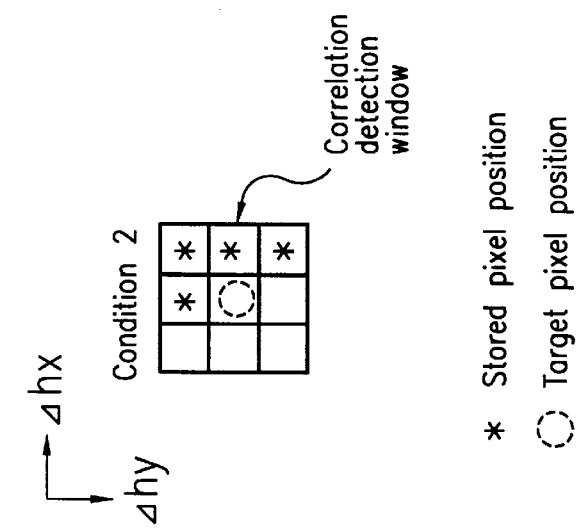
FIG. 18 is a schematic diagram showing operation of a delay circuit in the embodiment of FIG. 16.
Figure 18A:
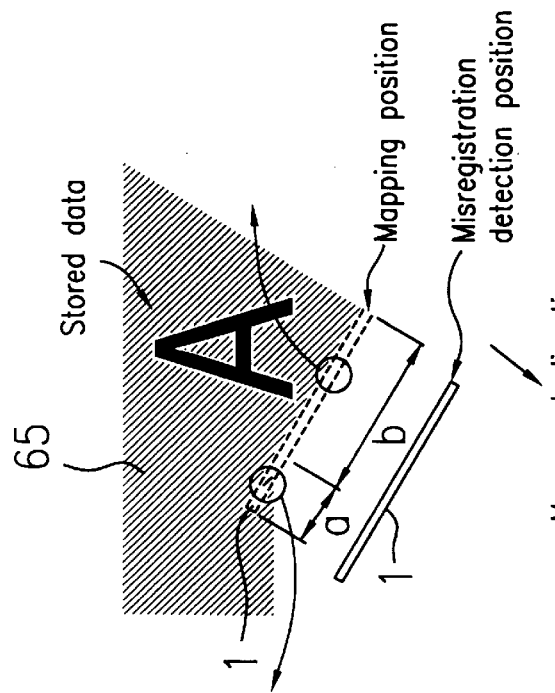
Figure 18B:
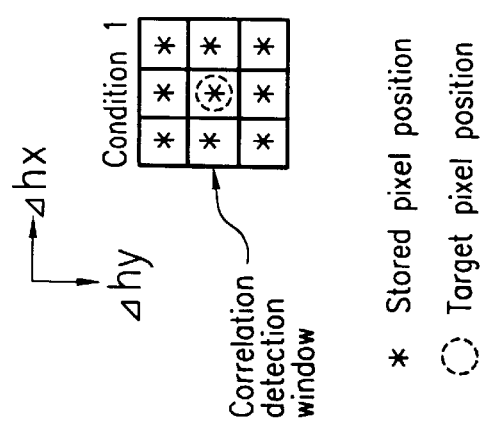

Next, a method of improving adjustment accuracy of position error by the delay circuit 9 will be explained by referring to FIGS. 14, 16, and 18. FIG. 18 is a schematic diagram showing an operation of a delay circuit shown as FIG. 16.

A division position adjustment amount (with division control) 705 shown in FIG. 14 is different from the position adjustment amount (without division control) 703 in that the adjustment value corresponding to the offset value 702 changes stepwise. It also lacks a necessary adjustment amount in a scanning area corresponding to a number of scanning lines during the time that it is variably controlled from the detection position of image correlation. When it lacks the adjustment amount in this way, an adjustment value needed for cancelling a position error is not sufficient, and a connection gap remains at the position where the position error is detected.

To avoid this condition of lacking in the adjustment amount, the adjustment scanning position coordinate 710 and the image data 400 are delayed in the delay circuit 9 with lines corresponding to a number of scanning lines during the time when the division position adjustment amount 705 is variably controlled. Then, in the mapping circuit 5, a mapping position and a detection position of position error detected by the image correlation circuit 72 are made to differ.

In FIG. 14, since the detection position of position error and the position where the division position adjustment amount 705 equals the position adjustment amount 703 have a gap of four lines between each other, the delay circuit 9 delays the adjustment scanning position coordinate 710 and the image data 400 by four lines. Due to this delay, the division position adjustment amount 705 that is the same as the position adjustment amount 703 can be obtained at the mapping position of the mapping circuit 5. Accordingly, the adjustment amount needed for cancelling a position error can be assured, so that adjustment accuracy of position error can be improved even more.

Furthermore, as shown in FIG. 18, three types of conditions arise at the manually scanned position of an area being read by the line image sensor 1, namely, an area a, an area b, and a mixture of the areas a and b. A new scanning area is always in the condition of the area b, and an area comprising a mixture of an overlapping scanning area and a new scanning area is in the mixed condition of the area a and the area b, and an overlapping area only is in the condition of the area a.

In the area a, a storage condition of image data in the memory 65 (FIG. 16) is in the condition 1 at the position inside the correlation detection window when a position error detection is conducted. In this condition 1, all the storage data is present in the vicinity of a target pixel position, so that a correlation value for conducting a position error detection can be detected.

In the area b, on the other hand, a storage condition of image data in the memory 65 (FIG. 16) is in the condition 2 at the position inside the correlation detection window when a position error detection is conducted. In this condition 2, both positions where the storage data is present and is not present are present in the vicinity of a target pixel position in a mixed state. Therefore, when a position error detection is conducted inside this correlation detection window, correlation values will be one-sided. This is because the correlation value can be produced from image information consisting of image data and storage data at the position where storage data is present, but at the position where storage data is not present, since there is no storage data, the correlation value is produced from initialized data and image data. When a position error is detected from the correlation value produced on the basis of two different data, a detection error is bound to occur.

To eliminate a detection error, scanning confirmation information of the memory 66 is used. When it is judged by the scanning confirmation information that even one position has an unstored pixel at the position inside the correlation detection window (namely, in the condition 2), a correlation value is not produced. The judgement of whether an unstored pixel is present or not is made by using the judgement signal 701 being detected in the overlapping area detection circuit 71. In this way, the correlation values are no longer one-sided, and accuracy of position error detection is improved.

By using the delay circuit 9 shown in FIG. 16, the mapping position and the detection position of position error are made to differ. By putting the detection position of position error ahead of a movement direction of the line image sensor 1, adjustment accuracy of position error is improved in a real-time process.

Incidentally, in the real-time process, when both a mapping process and a position error detection are conducted in parallel, pixels being mapped and stored newly in the vicinity of a target pixel arise frequently, so that the correlation value is influenced by the newly mapped pixels. Furthermore, when the detection position moves back and forth by an unintentional movement of the hands and so on, the influence by the newly mapped pixels becomes even greater, so that detection accuracy of position error deteriorates. Therefore, by making the mapping position and the detection position of position error different, and by putting the detection position of position error ahead of the movement direction of the line image sensor 1, the detection accuracy of position error can be improved by controlling the influence of the newly mapped pixels.

According to the configuration of the image processing apparatus of this invention mentioned above, by adding the adjustment of position error against the rotation direction which is caused by slipping of wheels, accuracy error between diameters of the wheels, accuracy error in a distance between the wheels, and sinking of the wheels into an original etc., the position error of the scanning position coordinate 300 can be adjusted with excellent accuracy.

In addition, by delaying the adjustment scanning position coordinate 710 and the image data 400 by the delay circuit 9, and by making the mapping position and the detection position of position error different, the correction value for cancelling the position error can be assured at the mapping position, so that adjustment accuracy of position error can be improved even more. Also, since it is possible to prevent data of a line being mapped immediately before from influencing the correlation value, adjustment accuracy of position error can be improved.

EXAMPLE 4

Figure 24:
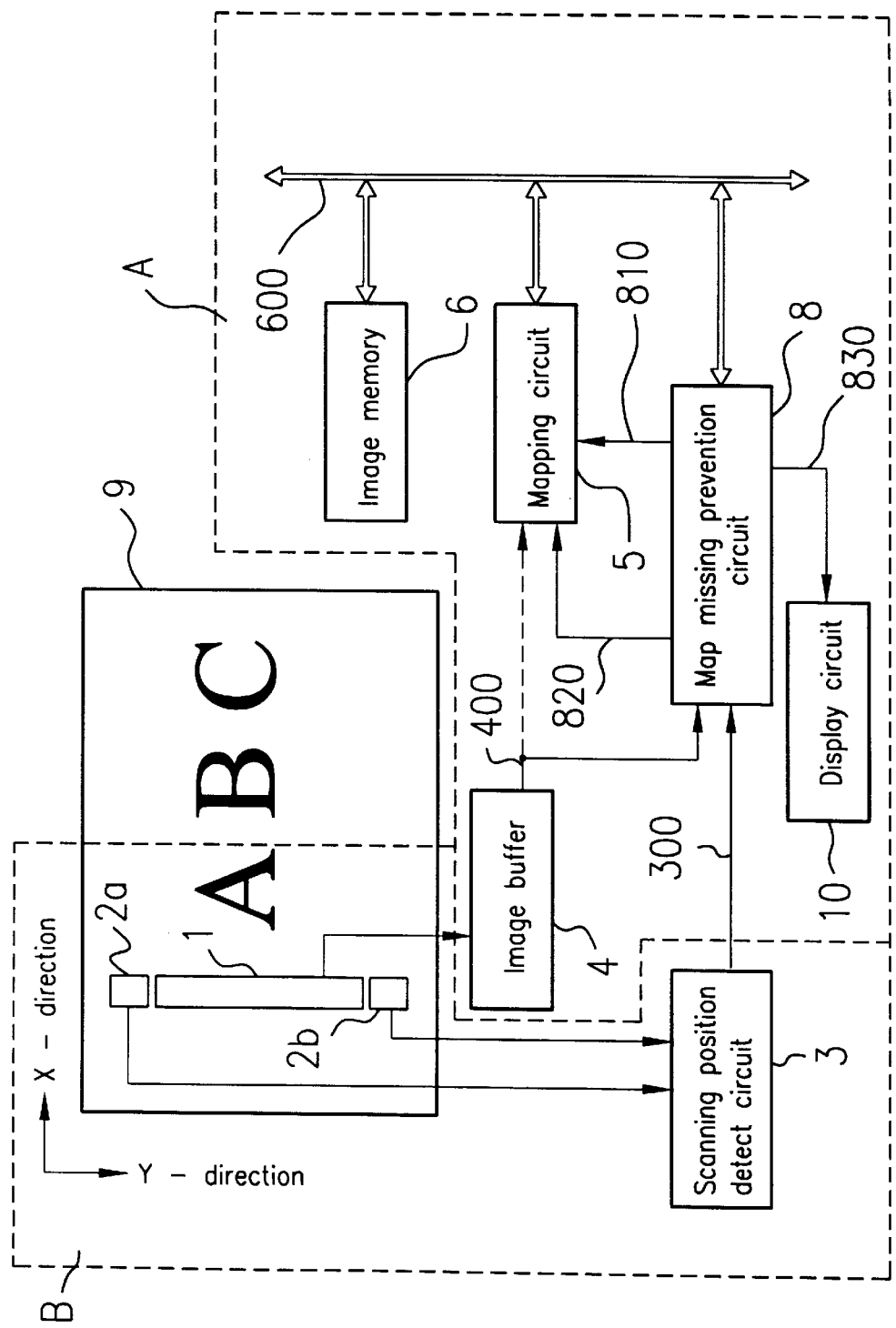
FIG. 24 is a block diagram showing an image processing apparatus and an image reading part which scans and reads an original image in the embodiment of FIG. 16.

Next, the fourth embodiment of an image processing apparatus of this invention will be explained. FIG. 24 is a block diagram of the image processing apparatus A and a image reading part B which reads and scans original images.

In FIG. 24, the line image sensor 1, the image buffer 4, the encoder 2a and 2b, the scanning position detection circuit 3, the image memory 6 and the mapping circuit 5 are the same as in the first embodiment. The scanning position detection circuit 3 calculates movement distance of the wheel based on the two-phase pulses from the encoders 2a and 2b, then calculates positions (coordinate) of read pixels at both ends of the line image sensor based on the formula 1 and 2, and produces the positions as the scanning position coordinate 300.

The primary difference between the embodiment in FIG. 24 and the first embodiment in FIG. 1 is that the position error detection circuit 7 in FIG. 1 is replaced with a map missing prevention circuit 8 and a display circuit 10. As the result of this alternation, the mapping circuit 5 receives mapping position coordinate 810 instead of adjusted position coordinate 710. The mapping circuit 5 also receives an image data 400 or a mapping data 820. Then, it sends out the image data 400 or the mapping data 820 to the image memory 6 via the bus 600.

The map missing prevention circuit 8 detects appearance of a map missing area from the difference of the coordinate value of the current scanning position coordinate 300 and the coordinate value of the previous scanning position coordinate 300, and sends the mapping position coordinate 810 and the mapping data 820 to the mapping circuit 5. The map missing prevention circuit 8 includes an error judgement circuit 84, which sends an error signal 830 to the display circuit 10 when the difference of the coordinate value of the current scanning position coordinate 300 and the coordinate value of the previous scanning position coordinate 300 exceeds a predetermined value. Through use of this process by the map missing prevention circuit 8, the appearance of the map missing area is prevented.

Figure 25:
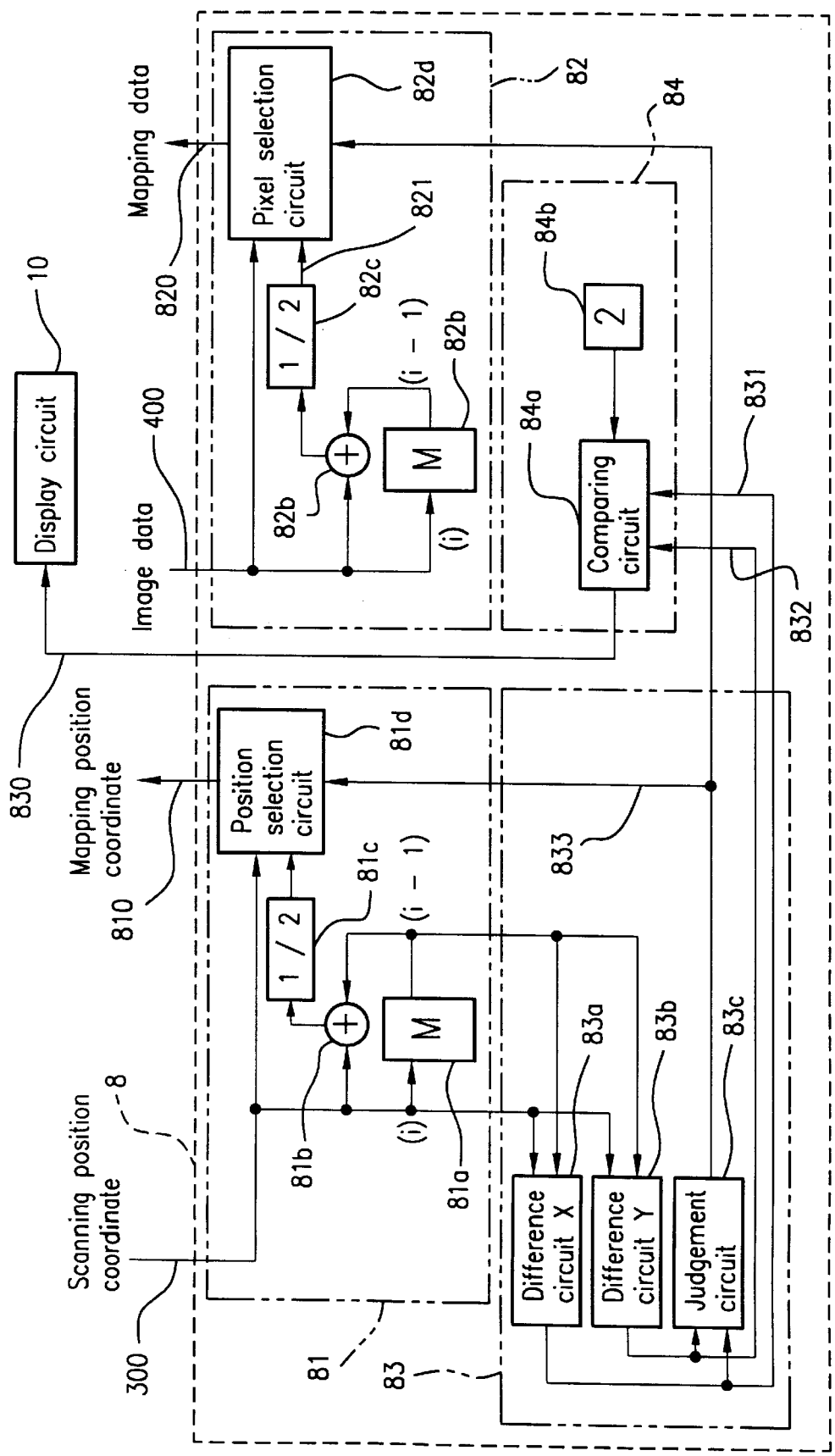
FIG. 25 is a block diagram showing a map missing prevention circuit in a fourth embodiment of the invention.
Figure 26:
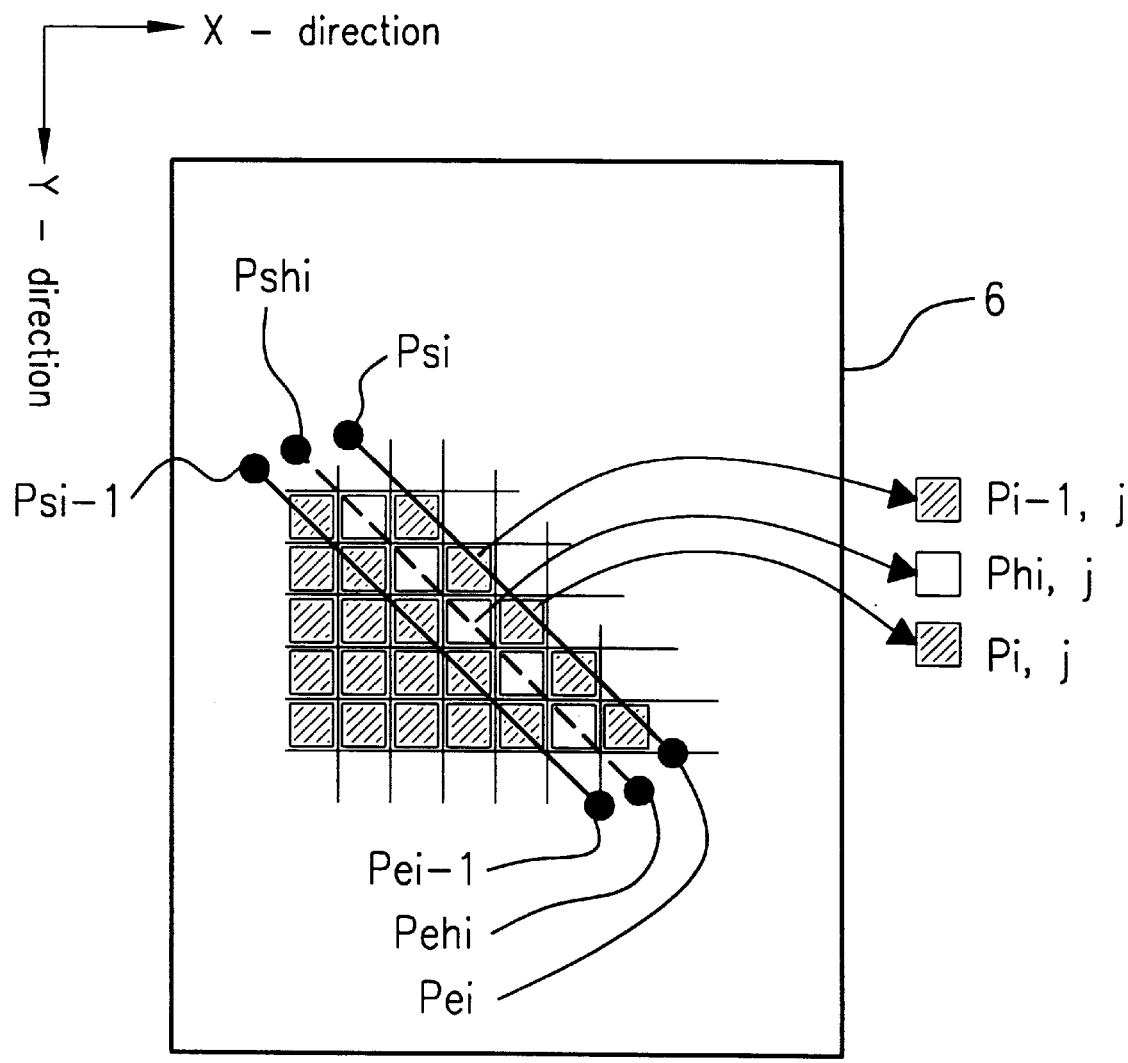
FIG. 26 is a schematic view showing an operation of the map missing prevention circuit in the embodiment of FIG. 25.

Further explanation of the map missing prevention circuit 8 will be made as follows referencing FIG. 25 and 26. FIG. 25 is a block diagram of the map missing prevention circuit 8, and FIG. 26 is a schematic view showing an operation of the map missing prevention circuit 8.

In FIG. 25, a coordinate generation circuit 81 will be explained first, where suffix i indicates the line number of the scanning position coordinate in the image data 400. A memory 81a is equipped for delaying both end positions (coordinates) $(Xs_i, Ys_i)$ and $(Xe_i, Ye_i)$ by one line in each scanning line. An adder 81b makes intermediate coordinates 811, i.e., $((Xs_i+Xs_{i-1})/2, (Ys_i+Ys_{i-1})/2)$ and $((Xe_i+Xe_{i-1})/2, (Ye_i+Ye_{i-1})/2)$ by adding both ends coordinates $(Xs_i, Ys_i)$, $(Xe_i, Ye_i)$ of the current line i and $(Xs_{i-1}, Ys_{i-1})$, $(Xe_{i-1}, Ye_{i-1})$ of the previous line i−1, and sending them to a divider 81c which consists of a bit shifter. In every scanning line, a position selection circuit 81d selects the scanning position coordinate 300 when a judge signal 833 is "L", and selects the intermediate coordinate 811 when the judge signal 833 is "H". The judge signal 833 will be explained in detail later.

Next, a store missing detect circuit will be explained. A difference circuit X 83a calculates the X-direction difference $XDs_i$ and $XDe_i$ between the both ends coordinates $(Xs_i, Ys_i)$, $(Xe_i, Ye_i)$ of a line i and $(Xs_{i-1}, Ys_{i-1})$, $(Xe_{i-1}, Ye_{i-1})$ of the previous line i−1 according to the following Formula 16:

$$XDs_i=|Xs_i-Xs_{i-1}|$$

$$XDe_i=|Xe_i-Xe_{i-1}|$$

where the scanning position coordinate 300 is calculated by using formula 2, and $||$ indicates an operation of obtaining an absolute value.

Also, a difference circuit Y 83b calculates the Y-direction difference $YDs_i$ and $YDe_i$ between the both ends coordinates $(Xs_i, Ys_i)$, $(Xe_i, Ye_i)$ of the current line i and $(Xs_{i-1}, Ys_{i-1})$, $(Xe_{i-1}, Ye_{i-1})$ of the previous line i−1 according to the following Formula 17:

$$YDs_i=|Ys_i-Ys_{i-1}|$$

$$YDe_i=|Ye_i-Ye_{i-1}|$$

where the scanning position coordinate 300 is calculated by using formula 2, and $||$ indicates an operation of obtaining an absolute value.

A judgement circuit 83c judges that a map missing area of the image data 400 has appeared when at least one of four coordinate difference $XDs_i, XDe_i, YDs_i$ and $YDe_i$ calculated based on the formula 16 and 17 exceeds 1.5 after being converted to an X,Y address of the image memory 6. The value is set at 1.5 because a map missing area may appear if the addresses of the image memory when storing the image data 400 are apart by two or more pixels. Therefor, the judgement circuit 83c produces a judgment result signal which turns "H" in the case that at least one of four coordinate differences $XDs_i, XDe_i, YDs_i$ and $YDe_i$ exceeds 1.5, and turns "L" in all other case.

Next, a data generating circuit 82 will be explained. Pi j represents a pixel data of No. j in line No. i in the image data 400. A memory 82a is equipped for delaying the pixel $P_{i,j}$ of line No. i by one line in each scanning line. The adder 82b makes intermediate coordinates 821, i.e., $(P_{i,j}+P_{i-1,j})/2$ by adding a pixel $P_{i,j}$ of line i to be input next and a pixel $P_{i-1,j}$ delayed by one scanning line, and outputs the result. In every scanning line, a pixel selection circuit 82d selects the image data 400 when the output signal 833 from the judgement circuit 83c is "L", while it selects the intermediate data 821 when the signal 833 is "H".

As shown in FIG. 26, the map missing prevention circuit 8 detects the appearance of a map missing area between line No. i and i–1 according to the formula 14 and 15. The map missing prevention circuit 8 generates an intermediate line that: ends pixels are $Ps_{hi}(Xs_{hi}, Ys_{hi})$ and $Pe_{hi}(Xe_{hi}, Ye_{hi})$ between line No. i and i–1 when a map missing area has been detected. The map missing prevention circuit 8 then sends the map position coordinate 810 of $(Xs_{hi}, Ys_{hi})$ and $e_{hi}(Xe_{hi}, Ye_{hi})$ to the mapping circuit 5. Here, suffix hi represents the No. of the intermediate line generated between line No. i and i–1; $Xs_{hi}=(Xs_i+Xs_{i-1})/2$; $Ys_{hi}=(Ys_i+Ys_{i-1})/2$; $Xe_{hi}=(Xe_i+Xe_{i-1})/2$; $Ye_{hi}=(Ye_i+Y_{i-1})/2$.

The mapping circuit 5 calculates coordinates of pixels in the intermediate line hi according to the following Formula 18:

$$XP_{hi,j}=Xs_{hi}+j \cdot (Xe_{hi}-Xs_{hi})/(Nd-1)$$

$$YP_{hi,j}=Ys_{hi}+j \cdot (Ye_{hi}-Ys_{hi})/(Nd-1)$$

where Nd represents the number of read pixels per one line; j represents the pixel number in a line; the coordinate of a pixel datai,j $(XP_{hi,j}, YP_{hi,j})$; "·" represents an operation of multiplication; "/" represents an operation of division.

The map missing pixel $P_{hi,j}$ in the image memory 6 is filled with a intermediate data 821, $(P_{i,j}+P_{i-1,j})/2$ generated by adding a pixel $P_{i,j}$ of line i and a pixel P of line i–1. In other lines, each coordinate of pixel in line i is calculated from Formula 4.

If four differences $XDs_i, XDe_i, YDs_i$ and $YDe_i$ calculated from formula 16 and 17 are small, the intermediate data 821 makes image data 400, and a map missing pixel $P_{hi,j}$ is filled with the image data 400. Thus, a circuit for interpolation is not necessary, and a good image without map missing areas can be reproduced in the image memory 6. As shown in FIG. 6, a pixel density conversion circuit 51 in the mapping circuit 5 receives the image data 400.

Thus, map missing prevention circuit 8 generates the intermediate coordinate 811 of the intermediate line when detecting the map missing area between lines i and i–1 in the image memory 6. Then it generates the intermediate data 821 that is to be stored in a pixel $P_{hi,j}$ within the map missing area, from a pixel $P_{i,j}$ of line i and a pixel $P_{i-1,j}$ of line i–1. The mapping circuit 5 stores the intermediate data 821 or the current image data 400 into the pixel $P_{hi,j}$ within the map missing area according to the intermediate coordinate 811. As a result, appearance of an area without image data is prevented, and a good image without map missing areas is reproduced in the image memory 6.

One intermediate line is generated in this fourth embodiment. Alternatively, N (N>1) intermediate lines can be generated by interpolation of the end coordinates $(Xs_i, Ys_i)$, $(Xe_i, Ye_i)$ of a line i and $(Xs_{i-1}, Ys_{i-1})$, $(Xe_{i-1}, Ye_{i-1})$ of the line i–1. Also, N (N>1) intermediate data corresponding to the intermediate lines can be generated by interpolation of the pixel $P_{i,j}$ of line i and a pixel $P_{i-1,j}$ of line i–1.

The capacity of the map missing prevention circuit 8 can be enhanced to prevent the appearance of an area without image data by increasing the number of intermediate lines. However, an actual image processing apparatus is designed under a cost limit, and the number of intermediate lines is determined from the the view point of practical use. The following explanation is concerned with the process in which the apparatus informs an operator of an error state when a map missing area exceeds the capacity of the map missing prevention circuit 8.

As shown in FIG. 25, An error judgement circuit 84 in the map missing prevention circuit 8 receives the X-direction difference 831 $(XDs_i, XDe_i)$ which is calculated by the difference circuit X 83a, and the Y-direction difference 832 $(YDs_i, YDe_i)$ which is calculated by the difference circuit Y 83b, and compares the maximum value of the differences with a predetermined value from a register 84b, and sends the error signal to the display circuit 10. The value of the register 84b is predetermined as (NH+1) from the number NH of intermediate lines.

If the maximum value of $(XDs_i, XDe_i, YDs_i, YDe_i)$ exceeds NH+1, then the error has exceeded the capacity of the map missing circuit, and a map missing area will result. In this example, NH+1 is 2 (two) because the number NH of intermediate lines is 1 (one). In this case, if either the maximum value of the X-direction difference 831 or the Y-direction difference 832 exceeds two, then an area without image data will appear. In this case, the error signal 830 turns "H" and is sent to the display circuit because the appearance of an area without image data cannot be prevented. The error signal 830 is "L" in the normal state when the appearance of an area without image data is prevented.

Next, the display circuit 10 will be explained referring to FIG. 27A which shows a block diagram of the circuit 10, and FIG. 27B which shows an example of a handy image scanner with a display panel 10b and LED 10c.

The display circuit 10 produces a signal for driving the display panel 10b and/or LED (or other light element) 10c according to the error signal 830 from the judgement circuit 83c.

The display panel 10b displays a message such as "ERROR !" or "DATA STORING ERROR !" when the error signal is "H", while it displays a message such as "GOOD" or no message when the signal is "L". Thus, the operator can identify a storing error by the message on the display panel 10b while reading an image. The LED 10c also informs the operator of the storing error by blinking or staying on when the error signal 830 is "H" and being off when the signal 830 is "L".

Figure 27B:
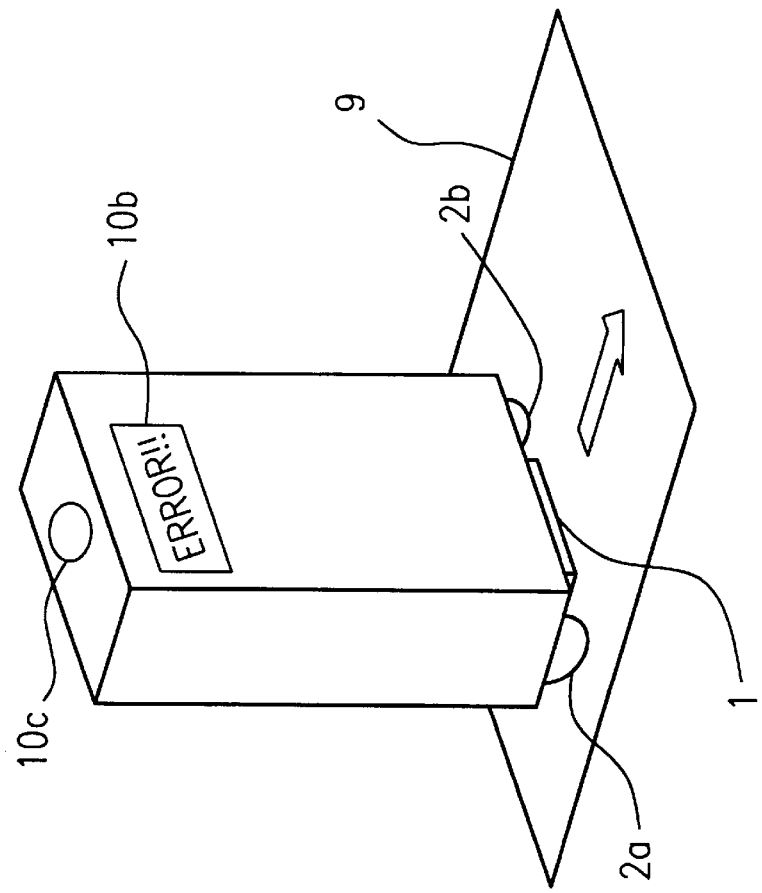
FIG. 27B is a perspective view showing an example of an image scanner with a display panel in the embodiment of FIG. 25.

As shown in FIG. 27B, the display panel 10b and/or the LED 10c are located at a position for easy recognition, so that an operator can check for a storing error promptly. The operator may slide the scanner body along the direction for scanning while checking the display panel 10b and/or the LED 10c.

A beeper and/or a vibrator also can be used as a informing means, and can replace or supplement the display panel 10b and/or the LED 10c.

Furthermore, LEDs of different colors can be used, e.g., red for "ERROR" and green for "GOOD" so that the operator can check the state easily. In any event, the operator can recognize the error while reading an image from an original.

It is possible to warn the operator by blinking a yellow LED before dealing with a map missing area that has appeared when it is within the limit that can be recovered.

The LED 10c can be used in the way such that it stays on or alternates its color in normal condition. It is enough if the LED can be recognized easily in abnormal condition, so that the operator is informed of the state. Thus, the operator can check the abnormal condition while scanning, so that the operation efficiency is improved by stopping useless scanning and immediately rescanning.

As explained above, by this fourth embodiment, appearance of an area without image data can be prevented by detecting a map missing area, and by storing intermediate data or current image data into the image memory within said area according to the intermediate coordinate that is generated by interpolating scanning position coordinates in the process of storing the image data that was gained by scanning an original image according to the scanning position corresponding to the image data.. As a result, white lines in a black image or character image do not appear, and the quality of the image that is reproduced in the image memory is improved. Moreover, the operator can check the storing error while scanning, so that the operation efficiency is improved by stopping useless scanning and immediately rescanning. The apparatus judges storing error by comparing the difference of two separate scanning positions and displays the error in accordance with the judgement.

EXAMPLE 5

Figure 28:
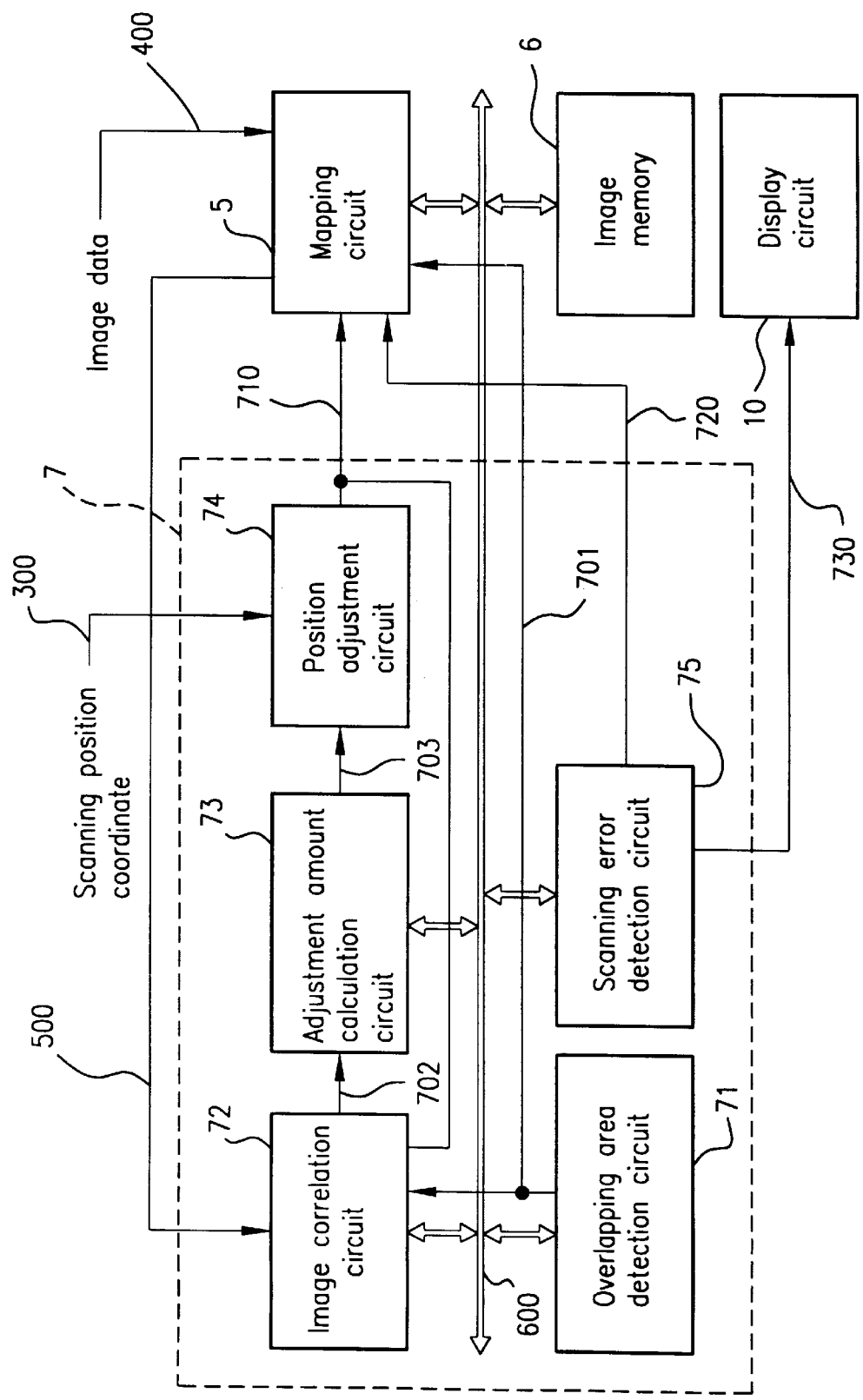
FIG. 28 is a block diagram showing a position error detecting circuit including a scanning error detection circuit in a fifth embodiment of the invention.

Next, the fifth embodiment of an image processing apparatus of this invention will be explained. FIG. 28 is a block diagram of the position error detection circuit 7 including a scanning error detection circuit 75.

In this embodiment, line image sensor 1, image buffer 4, encoders 2a and 2b, scanning position detect circuit 3, image memory 6 and mapping circuit 5 are the same as in the first embodiment. The scanning position detect circuit 3 calculates the movement distance of wheels based on 2-phase pulse from encoders 2a and 2b, and produces coordinates of read pixels at both ends of the line image sensor 1 as the scanning position coordinates 300.

In FIG. 28, the scanning error detection circuit 75 is added in the position error detection circuit 7, which is different from the position error detection circuit 7 of the first embodiment. A display circuit 10 is also added which displays a scanning error according to an error signal from the the scanning error detection circuit 75. Furthermore, the mapping circuit 5 can halt storing of the image data 400 into the image memory 6 according to a halt signal 720 from the scan error detection circuit 75. This display circuit 10 is the same as illustrated in FIG. 27A of the fourth embodiment, and it displays an error or warning message according to the error signal. The following explanation is about scanning error that is caused by a different factor from that in the fourth embodiment.

In the first embodiment, even if the scanning position coordinate 300 that is detected by the scanning position detection circuit 3 includes position error, the position error detection circuit 7 detects position errors by calculating correlation of the current image data 400 and stored image data in the image memory 6 for an overlapping scanned area, and the mapping circuit 5 adjusts the mapping position.

In the fourth embodiment, the appearance of an area without image data can be prevented by detecting a map missing area in the image memory 6, and by storing intermediate data 821 or current image data 400 into the image memory 6 according to the intermediate coordinate 821 that is generated by interpolating scanning position coordinates 300 in the process of storing the image data 400 that is gained by scanning an original image into the image memory 6 according to the scanning position coordinate 300 corresponding to the image data 400.

In short, an adjustment process based on the image data 400 and the scanning position coordinate 300 is performed in the first embodiment, and a prevention process based on the scanning position coordinate 300 is performed.

However, if an abnormal state in scanning such as slippage of the wheels or separation of them from the original (i.e., floating) occurred, reliability of the scanning position coordinate 300 drops. As explained in the first embodiment, each encoder 2a, 2b generates a 2-phase pulse having phases that differ according to an angle of the wheel, and the scanning position detection circuit 3 detects the movement distance and direction of each wheel. The scanning position detection circuit 3 calculates the coordinate of each wheel on the original image based on the movement distance of the wheel, converts the coordinate into the coordinate of a read pixel at each end of the line image sensor 1, and produces the result as the scanning position coordinate. Therefor, reliability of the scanning position coordinate 300 drops a lot, and the error exceeds the capacity limit of adjustment in the first embodiment or prevention in the fourth embodiment, during an abnormal scanning state. Furthermore, if the line sensor 1 is separated from the original image, distortion may appear in the image data 400, so that the adjustment capacity of the image processing apparatus in the first embodiment goes down.

A proper technique is necessary to deal with the scanning error because the adjustment or prevention processes discussed above are ineffective in response to abnormal states such as floating of wheels, i.e., being apart from paper. Floating of wheels that may cause the scanning error can be detected by a mechanism, but slippage of wheels is difficult to detect directly by a mechanism because it is caused by a relationship between wheel torque and friction between the wheel and the paper. Electrical troubles are also difficult to detect directly by a mechanism.

Thus, the scanning error must be detected by electrical means. In this fifth embodiment, the scanning error is detected from a correlation between the current image data 400 and the stored data in the image memory 6. It is possible to detect mechanical trouble such as slippage or floating of wheels as well as electrical trouble such as break or short of wires.

Figure 29:
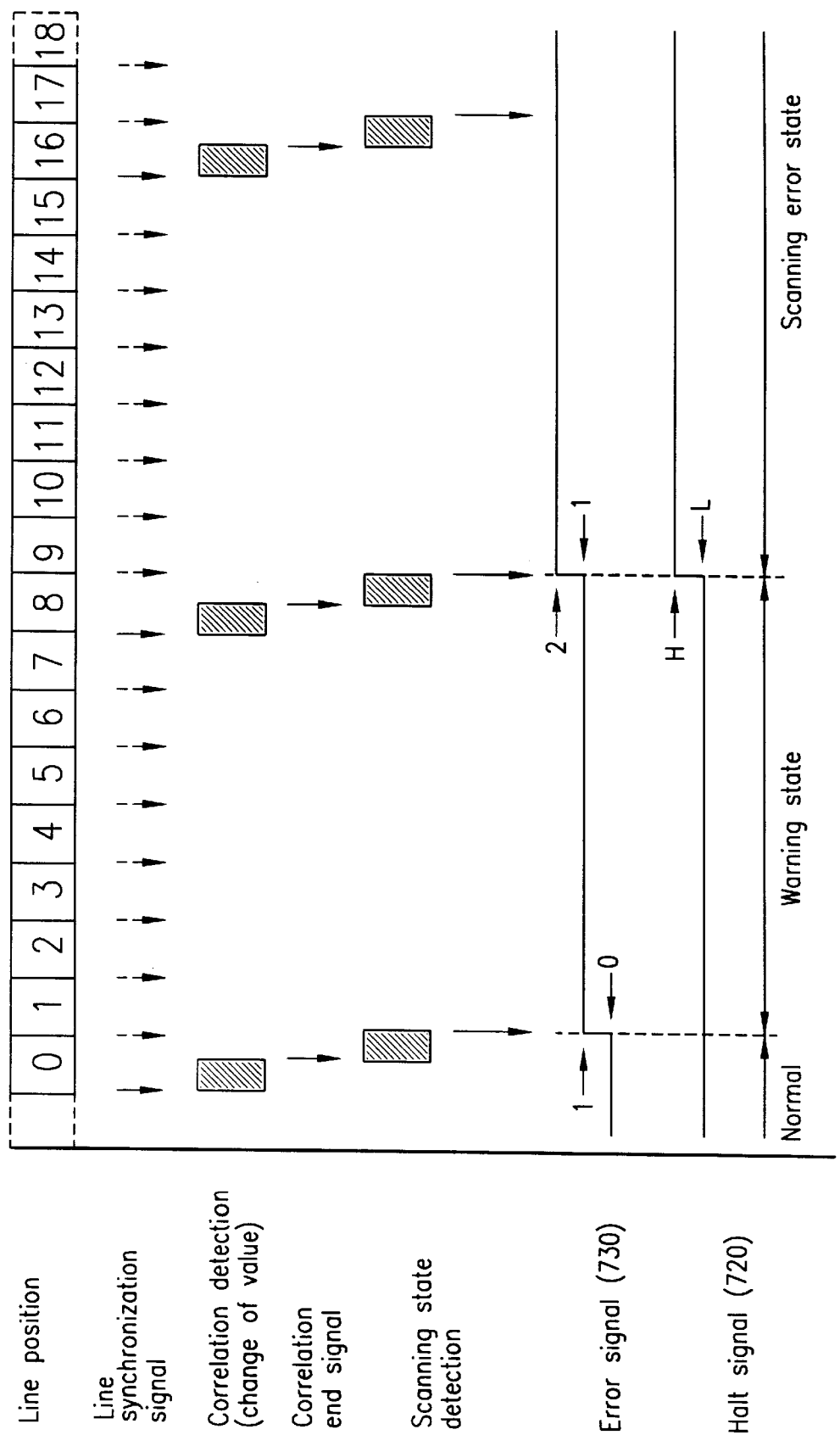
FIG. 29 is a timing chart of a scanning error detection circuit in the embodiment of FIG. 28.

The following explanation of the process when the above scanning error happens is performed referring to FIG. 28 as well as FIGS. 29 and 30. FIG. 29 is a timing chart of the scanning error detection circuit 75, and FIG. 30 illustrates the states of correlation data that are generated in the image correlation circuit 72.

In FIG. 28, the scanning error detection circuit 75 sends an error signal 730 having a level corresponding to the scanning state to the display circuit 10 and a halt signal 720 to the mapping circuit 5 when detecting the scanning state from the correlation table value h(m,n) generated in the image correlation circuit 72. The scanning error detection circuit 75 also changes the error signal 730 into "0" and the halt signal into "L" at normal scanning state, while it changes the error signal 730 into "1" and the halt signal into "H" at an abnormal scanning state.

Figure 27A:
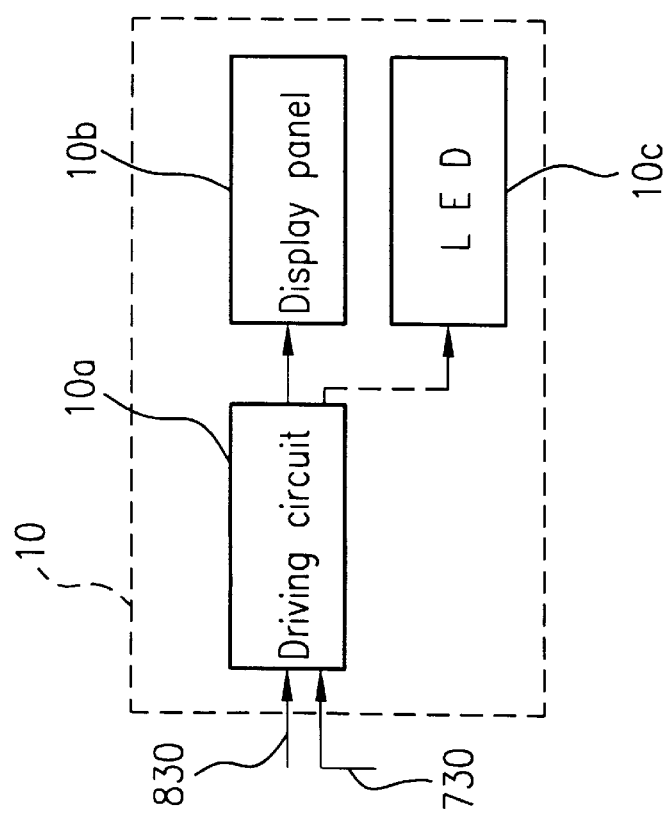
FIG. 27A is a block diagram showing a display circuit in the embodiment of FIG. 25.

The mapping circuit 5 is the same as illustrated in FIG. 27A of the second embodiment. A drive circuit 10a sends a signal to the display panel 10b or LED 10c according to the level of the error signal.

The operation of the scanning error detection circuit 75 will be explained referring to a timing chart illustrated in FIG. 29. Here, the image correlation is processed in line i at first, and the image correlation detection is performed once every eight lines. In FIG. 29, the line position indicates the line number minus i. Thus, line i is indicated by line position 0, line (i+8) is indicated by line position 8.

The mapping circuit 5 sends a line synchronizing signal to the scanning error detection circuit 75 and the image correlation circuit 72.

The image correlation circuit 72 regards the first scanning line position as initializing line position (i=0), counts the line synchronizing signals from the initializing line position, calculates an image correlation when the count number i is divided by eight and remains zero, and changes the correlation table value h(m,n) according to formula 12 in the first embodiment. The image correlation circuit 72 sends a correlation end signal to the scanning error detection circuit 75 via a bus 600 when a correlation table value is changed.

The scanning error detection circuit 75 searches the correlation table value generated in the image correlation circuit 72 via the bus 600 after receiving the correlation end signal from the image correlation circuit 72, and checks the correlation table value h(m,n) to detect the scanning state. After checking the correlation table value h(m,n) and detecting the scanning state, the scanning error detection circuit 75 sends the error signal 730 corresponding to the detected state to the display circuit 10 and the halt signal 720 to the mapping circuit 5 according to the line synchronizing signal from the next line position.

FIG. 29, for example, illustrates the situation in which scanning is performed normally (correctly) before line (i−1). In this case, the scanning error detection circuit 75 detects a warning state at line i, and the scanning error detection circuit 75 detects scanning error at line (i+8). The scanning error detection circuit 75 responds by changing the error signal 730 into "0" and the halt signal 720 into "L" before line i. It also changes the error signal 730 into "1" and the halt signal 720 into "L" in the warning state between line (i+1) and line (i+8). In the scanning error states after line (i+9), it changes the error signal 730 into "2" and the halt signal 720 into "H".

The mapping circuit 5 stores the image data 400 into the image memory 6 in the normal state and the warning state in which the halt signal is low, while it stops storing the image data 400 into the image memory 6 in all other cases.

The driving circuit 10a of the display circuit 10 illustrated in FIG. 27A sends the drive signal to the display panel 10b and/or the LED 10c according to the error signal 730.

The display panel 10b displays a message such as "ERROR!!" OR "SCANNING ERROR!!" in the line position of the scanning error state in which the error signal 730 is "2", displays a message such as "WARNING!!" or "SCAN CAREFULLY!!" in the line position of the warning state in which the error signal 730 is "1", and displays a message such as "GOOD" or no message in the line position of the normal scanning state in which the error signal 730 is "0". By the message on the display panel 10b, the operator can check the scanning state while scanning. LED (or other light element) 10c stays on in the line position of the scanning error state in which the error signal 730 is "2", blinks in the line position of the warning state in which the error signal 730 is "1", and goes off in the line position of the normal scanning state in which the error signal 730 is "0", so that the operator is informed of the scanning state.

Next, the method of detecting the scanning state from the correlation table value h(m,n) generated in the image correlation circuit will be explained referring to FIGS. 30A to 30C. Though the value of m and n in the correlation table value h(m,n) is not specified in the third embodiment, the value of m and n is assumed to be −1, 0 or +1 in the following explanation.

FIGS. 30A to 30C illustrate the state of the correlation table value h(m,n) generated in the image correlation circuit 72 at n=−1, 0, +1 respectively. As illustrated in FIG. 19, the correlation table value h(m,n) generated in the image correlation circuit 72 has states like state a, state b, state c corresponding to the scanning state.

The order of correlation data in the normal scanning state without any slipping or floating of wheels on the original image can be estimated by designing and experiment. Thus, the judgement standard with regard to the correlation data can be determined considering the adjustment capacity and prevention capacity.

For example, it is understood from the scanning experiment that if the correlation data is less than Er1, the scanning state is normal. In this normal scanning state, there is enough capacity of adjustment and prevention. Similarly, the result is obtained by a scanning experiment that the correlation data is between Er1 and Er2 when the slipping or floating of wheels occurred. In this state, capacities of the adjustment and the prevention are near limits. Further, the result is obtained by scanning experiment that the correlation data is more than Er2 when the slipping or floating of wheels occurred frequently. In this state, adjustment or prevention cannot be performed as the error exceeds their capacity limit. As a result, the scanning error is recognized.

In FIG. 30, state a is the normal state as the correlation table value h(m,n) is below Er1. State b is the warning state within adjustment and prevention capacity through it is potentially not a normal state as the correlation table value h(m,n) is between Er1 and Er2. State c is the scanning error state which is beyond adjustment and prevention capacity as the correlation table value h(m,n) is above Er2. State c is the abnormal state in which mechanical troubles like looseness of screws or electrical troubles like break or short of wires are detected.

Thus, the scanning error detection circuit 75 detects the scanning state by comparing the correlation table value with the predetermined value Er1 and Er2. Furthermore, concerning mechanical troubles like looseness of screws or electrical troubles like break or short of wires, it is possible to detect such troubles by getting the correlation table value h(m,n) experimentally in advance.

As explained above, in this fifth embodiment, the process dealing with the scanning error can be performed promptly as the apparatus can detect the scanning error from the correlation data. It is also possible to prevent storing image data in abnormal state as the storing process of the image can be halted on the way of scanning. Furthermore, the operator can check the scanning error while scanning as the apparatus can detect the scanning error from the correlation data and display the scanning error so that the operation efficiency is improved by stopping useless storing and by rescanning immediately.

In the embodiments of this invention explained above, the input image data and the scanning position coordinate are input from a hand-held scanner that uses two encoders 2a, 2b to generate pulses in accordance to the rotation of two wheels 31, 32 installed at both ends of the line image sensor 1. However, it is not necessarily limited to this configuration only. For example, it may be configured such that a tablet or a sheet on which a reference grid is printed is used as auxiliary equipment, and that it is input from a hand-held scanner which obtains the scanning position coordinate and the image data by detecting both ends of the line image sensor 1 (for example, U.S. Pat. Nos. 4,260,979 and 4,581, 761).

In addition, in these embodiments, although it is explained by referring to an example of an image processing apparatus which processes image signals being input from a hand-held scanner using the line image sensor 1, the image input device is not necessarily limited to the hand-held scanner. For example, image signals coming from an image input device which uses an area image sensor may be processed as well.

Also, the same process as in the embodiments mentioned above may be attained by using a personal computer, a MPU (microprocessor unit), or a DSP (digital signal processor).

Figure 19C:
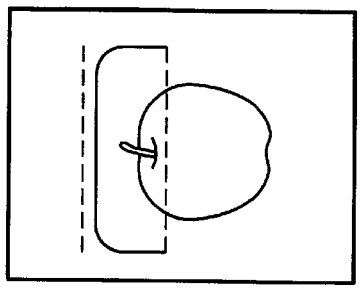
FIGS. 19A to 19E are schematic diagrams showing a connection gap of an image that is caused by a position error of a scanning position.
Figure 19E:
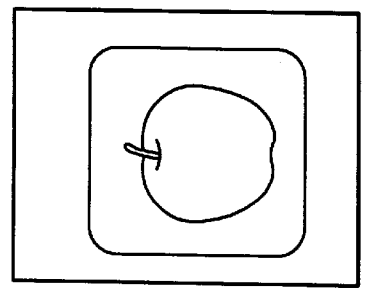
Figure 19B:
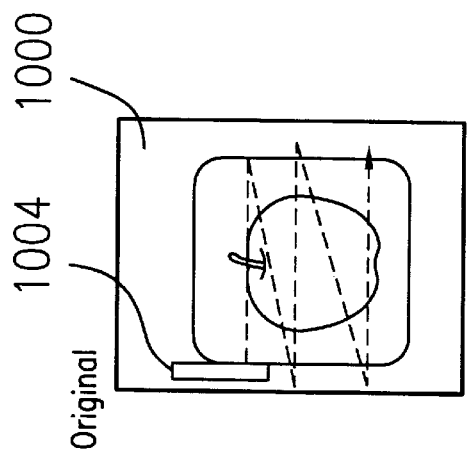
Figure 19D:
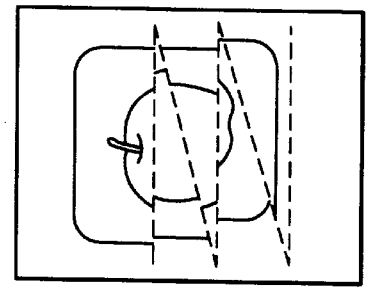
Figure 19A:
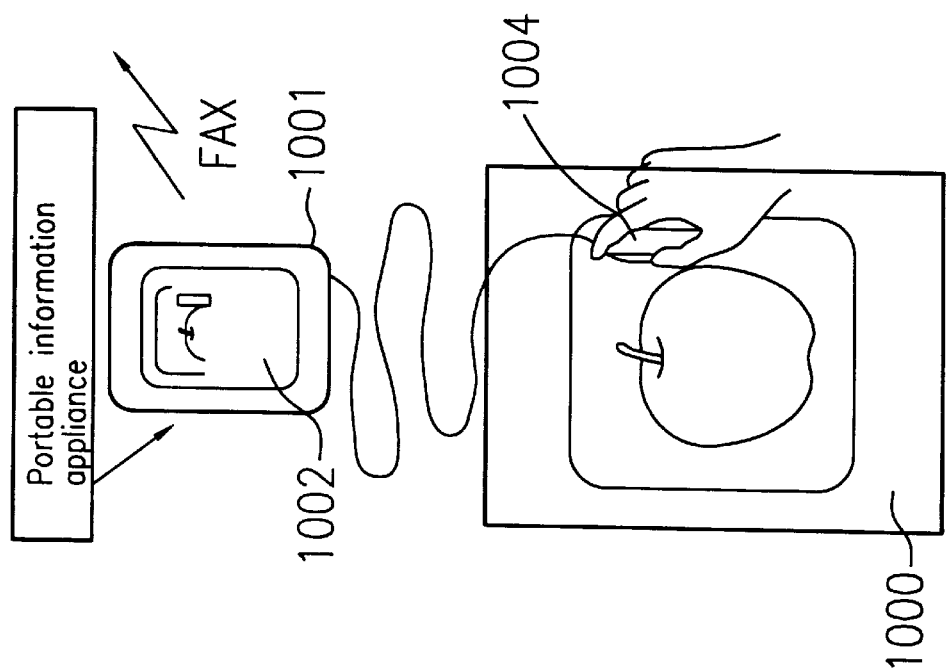
Figure 20:
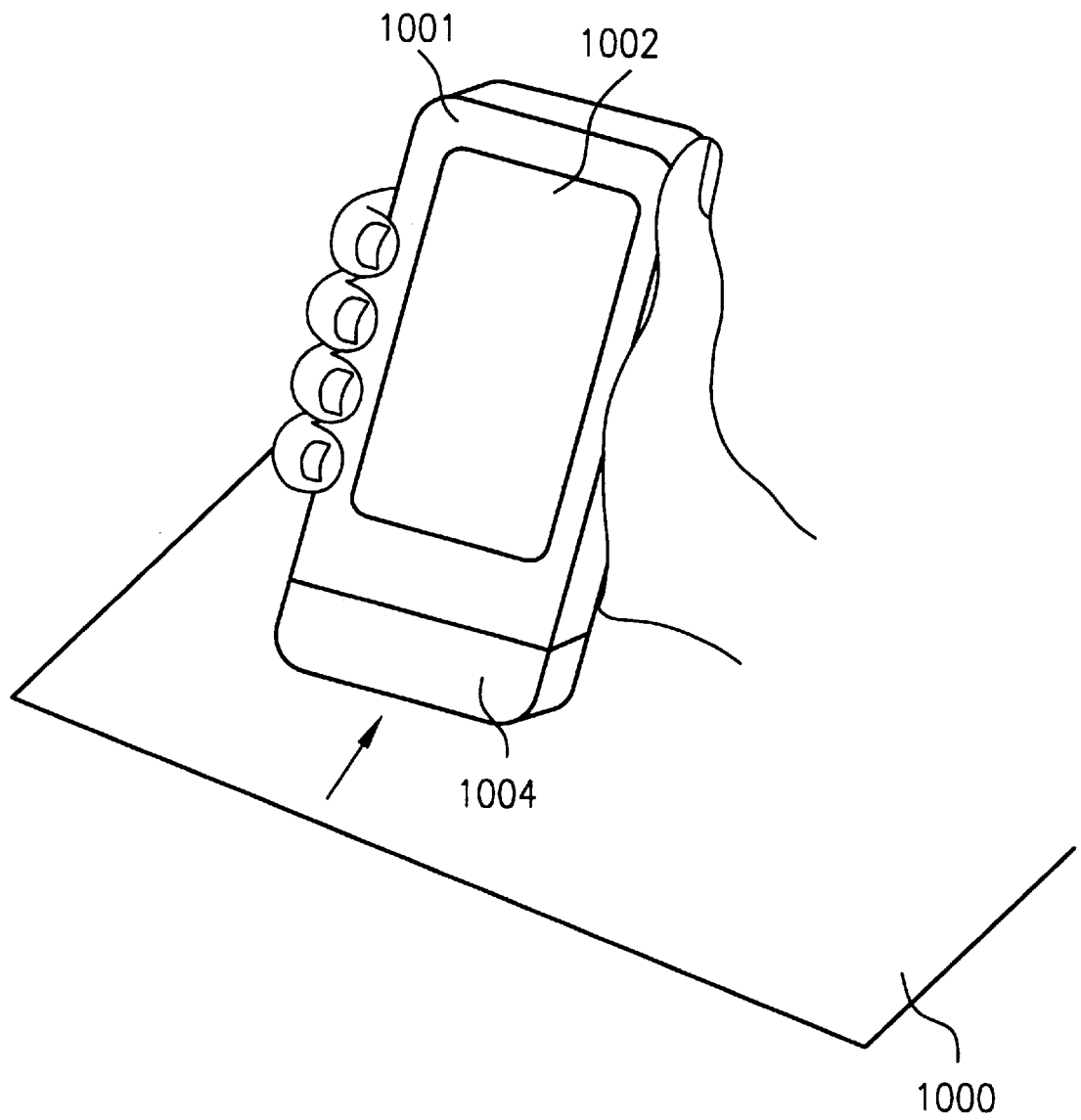
FIG. 20 is a perspective view showing an example of a portable terminal appliance of the embodiment of FIG. 16.
Figure 21:
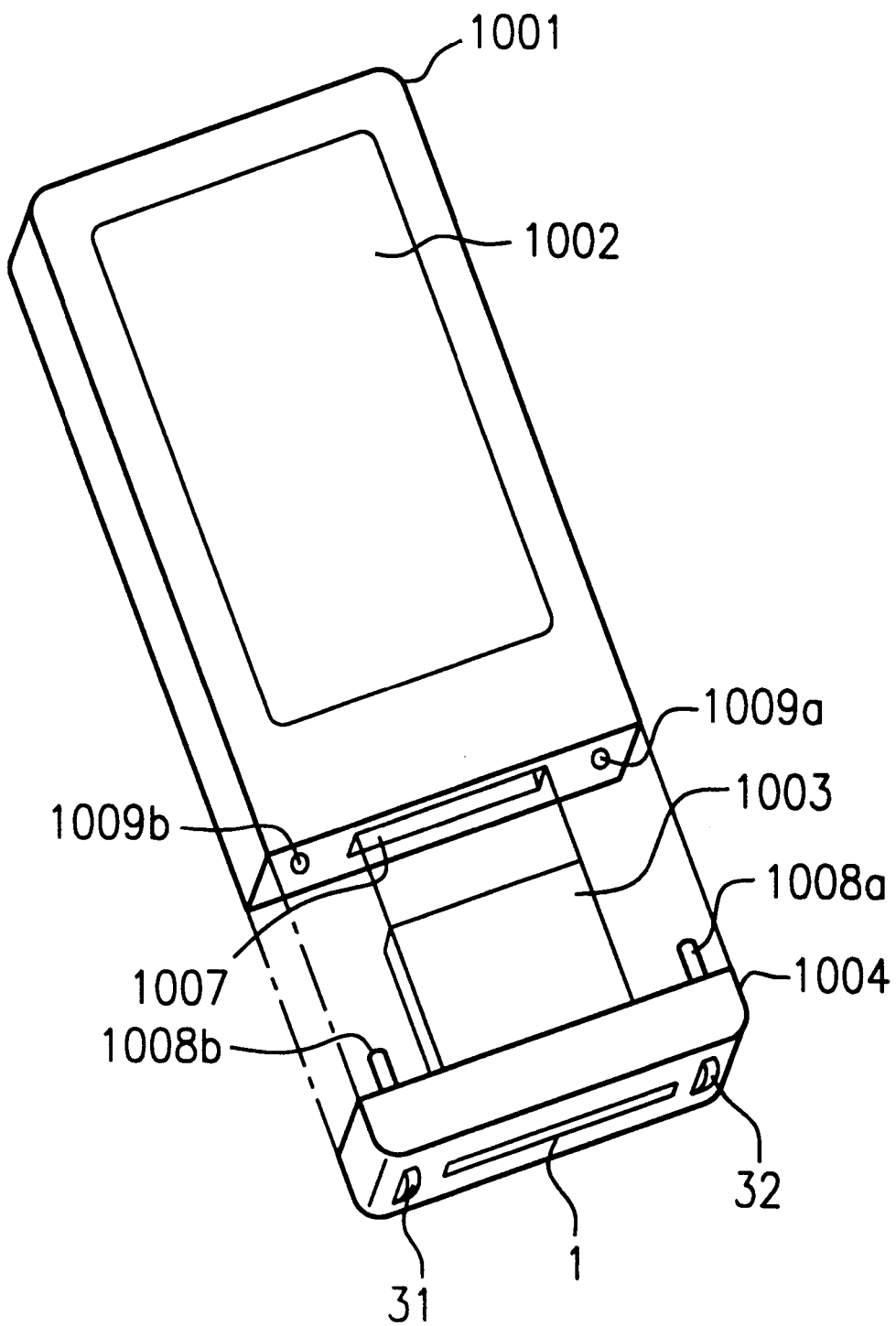
FIG. 21 is an expanded perspective view showing another example of a portable terminal appliance of the embodiment of FIG. 16.
Figure 22:
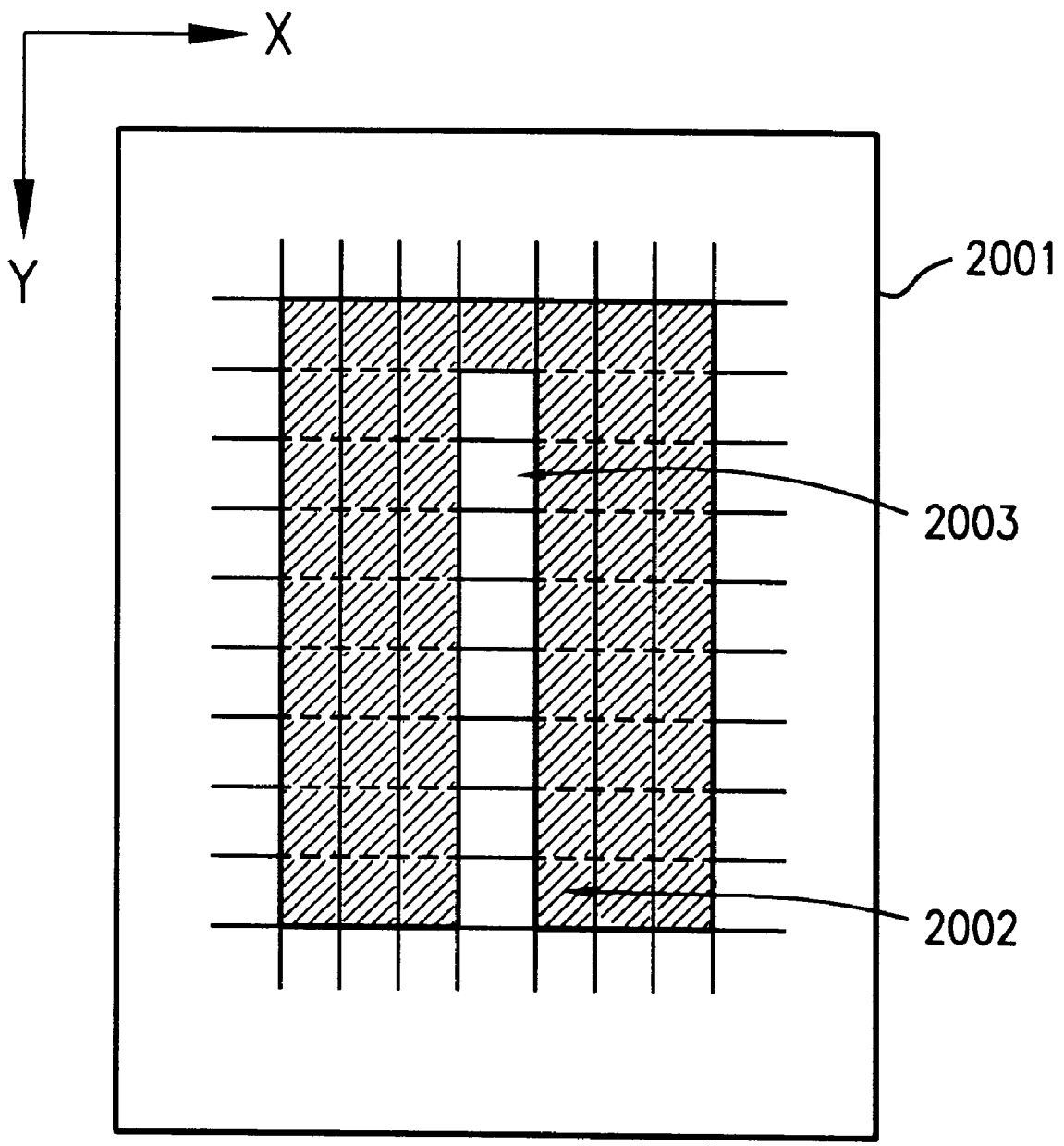
FIG. 22 is a schematic diagram showing an example of a map missing condition in conventional techniques.
Figure 23A:
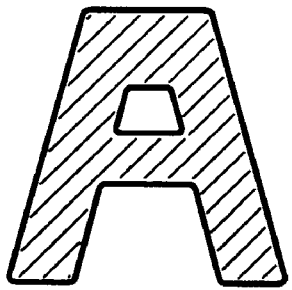
FIGS. 23A and 23B are schematic diagrams showing another example of a map missing condition in conventional techniques.
Figure 23B:
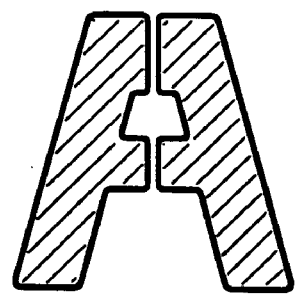

Furthermore, as shown in FIG. 19A, the image processing apparatus of this invention receives images from a small input device 1004 having a limited reading range and forms wide-screen images by joining and composing partial images on an original 1000. Therefore, when the image processing apparatus of this invention is mounted to a main body 1001 of a portable information appliance, an image input of a large original can be conducted even if the portable information appliance has the small input device 1004. For example, this apparatus is suitable for a portable FAX, a portable information terminal, a portable scanner, and so forth. Also, as shown in FIG. 20, the input device 1004 can be miniaturized, so that it can be used integrally with the main body of a portable terminal. By using a personal computer instead of the portable terminal 1001, it is possible to attain an input apparatus 1004 with small body but capable of reading a wide image, so that operation efficiency is improved. Here, the input device 1004 is a scanner having the image reading part B shown in FIG. 16.

Furthermore, as shown in FIG. 19E, the image processing apparatus of this invention conducts an adjustment by accumulating a position error of a scanning position coordinate being detected, so that images without connection gaps can be produced by adjusting the position error, even with the use of the input device 1004 having a large cumulative position error. Therefore, as applied in the embodiments mentioned above, when this image processing apparatus is mounted to a hand-held scanner which uses two encoders 2a, 2b for generating pulses in accordance to the rotation of two wheels 31, 32 disposed at both ends of the line image sensor 1, an even greater effect can be obtained. In this case, compared with a hand-held scanner which uses a tablet or a sheet having a reference grid printed as auxiliary equipment, the apparatus dose not need expensive auxiliary equipment. It is small and excellent in portability and in operation. Furthermore, even a thick book can be read. Here, the input device 1004 is a scanner having the image reading part B shown in FIG. 16.

The invention may be embodied in other forms without departing from the spirit or essential characteristics thereof. The embodiments disclosed in this application are to be considered in all respects as illustrative and not as restrictive. The scope of the invention is indicated by the appended claims rather than by the foregoing description, and all changes which come within the meaning and range of equivalency of the claims are intended to be embraced therein.

What is claimed is:

1. An image processing apparatus for receiving image data from a line sensor, receiving scanning position data of the line sensor in sequential order and storing the image data in an image memory in accordance with the scanning position data, said image processing apparatus comprising:

the image memory for storing the image data;

means for detecting a differential between the scanning position data of the line sensor read into the image memory in sequential order from scanning positions of said line sensor;

means for comparing the differential detected by the detecting means with a predetermined distance to determine if the differential is more than the predetermined distance; and means for preventing an appearance of a vacant area that can be generated between two scanned lines in which the image data is not stored in the image memory, when the comparing means determines that the differential is more than the predetermined distance.

2. The image processing apparatus according to claim 1, wherein the preventing means comprises means for generating an intermediate scanning position by interpolating two scanning positions preceding and following the vacant area and means for storing substitute image data for the intermediate scanning position into the image memory.

3. The image processing apparatus according to claim 2, wherein the substitute image data is either image data preceding the vacant area or intermediate image data generated by interpolating image data preceding and following the vacant area.

4. The image processing apparatus according to claim 1, further comprising means for informing the operator of an abnormal state when the comparing means determines that the differential is more than the predetermined distance.

5. The image processing apparatus according to claim 4, wherein said means for informing informs the operator of another abnormal state when the preventing means cannot prevent the appearance of the vacant area.

6. The image processing apparatus according to claim 1, wherein the scanning positions of the line sensor are a current scanning position and a previous scanning position.

7. The image processing apparatus according to claim 6, wherein the scanning position data are specified by coordinates.

8. An image processing apparatus comprising:

an image memory for storing image data;

means for storing the image data into the image memory line by line;

means for correcting a storing position shift of the image data;

means for calculating a correlation value between newly read image data and stored image data in the image memory concerning an overlapping scanned area as a line unit and outputting the correlation value;

means for detecting a range in which the correcting means can properly correct the storing position shift of the image data in accordance with the correlation value, by comparing the correlation value with a predetermined reference value; and means for judging an abnormal storage when the storing position shift exceeds the range in which the correcting means can properly correct the storing position shift of the image data.

9. The image processing apparatus according to claim 8, further comprising means for halting storage of the image data into the image memory when the judging means determines that there is an abnormal storage.

10. The image processing apparatus according to claim 8, further comprising means for informing the operator of the abnormal stage.

11. The image processing apparatus according to claim 10, wherein the informing means has a plurality of levels of informing.

* * * * *